US010975781B2

(12) United States Patent
Kobayashi

(10) Patent No.: US 10,975,781 B2
(45) Date of Patent: Apr. 13, 2021

(54) ROTATION SPEED CONTROL DEVICE

(71) Applicant: SUZUKI MOTOR CORPORATION, Hamamatsu (JP)

(72) Inventor: Yutaro Kobayashi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 50 days.

(21) Appl. No.: 16/413,196

(22) Filed: May 15, 2019

(65) Prior Publication Data
US 2019/0376458 A1 Dec. 12, 2019

(30) Foreign Application Priority Data
Jun. 8, 2018 (JP) .............................. JP2018-110201

(51) Int. Cl.
F02D 31/00 (2006.01)
F02D 35/00 (2006.01)
B60W 30/188 (2012.01)
B60W 10/06 (2006.01)
B60W 20/30 (2016.01)
(Continued)

(52) U.S. Cl.
CPC ........... *F02D 31/001* (2013.01); *F02D 29/02* (2013.01); *F02D 35/00* (2013.01); *F16H 63/50* (2013.01)

(58) Field of Classification Search
CPC ........ F02D 31/001; F02D 29/02; F02D 35/00; B60W 30/1884; B60W 10/06; B60W 10/08; B60W 20/30
See application file for complete search history.

(56) References Cited

U.S. PATENT DOCUMENTS 4,476,828 A * 10/1984 Kobayashi ............ F02D 31/005
123/585
7,959,535 B2 * 6/2011 Matsubara ............ B60W 30/19
477/3
(Continued)

FOREIGN PATENT DOCUMENTS

JP 05272369 A * 10/1993 ............. F02D 29/00
JP 2003-148615 A 5/2003
(Continued)

OTHER PUBLICATIONS

Japanese Office Action dated Aug. 27, 2019, issued to Japanese Application No. 2018-110201.
(Continued)

Primary Examiner — Tisha D Lewis
(74) Attorney, Agent, or Firm — Stein IP, LLC

(57) ABSTRACT

There is provided an engine rotation speed control device for performing over-speed rotation prevention control to decrease an engine rotation speed if the engine rotation speed exceeds a first upper limit rotation speed. If a gear position of a transmission is a neutral state or an intermediate neutral state in which predetermined gears are not engaged with each other in the middle of a gear change operation of the transmission, a second upper limit rotation speed which is lower than the first upper limit rotation speed is set. If the engine rotation speed at the time when the gear position of the transmission is the neutral state or the intermediate neutral state is higher than the second upper limit rotation speed, the over-speed rotation prevention control is performed.

12 Claims, 14 Drawing Sheets

(51) Int. Cl.
  *F02D 29/02*     (2006.01)
  *F16H 63/50*     (2006.01)

(56)        References Cited

U.S. PATENT DOCUMENTS

2005/0153816 A1*  7/2005  Yoda .................... F02D 41/008
                                                        477/111
2008/0300761 A1* 12/2008  Matsubara ............ B60W 10/10
                                                         701/61
2009/0305832 A1  12/2009  Matsubara et al. ........... 475/150
2010/0069196 A1   3/2010  Shibata et al. .................... 477/3
2012/0017871 A1*  1/2012  Matsuda ................. F02D 29/02
                                                        123/349
2019/0055911 A1*  2/2019  Hesketh .............. F02N 11/0855

FOREIGN PATENT DOCUMENTS

JP       2008-120352 A      5/2008
JP       2009-298175 A     12/2009
JP       2014-194251 A     10/2014

OTHER PUBLICATIONS

Japanese Office Action dated Jan. 21, 2020, issued to Japanese Application No. 2018-110201.

* cited by examiner

ROTATION SPEED CONTROL DEVICE

CROSS-REFERENCE TO RELATED APPLICATIONS

The disclosure of Japanese Patent Application No. 2018-110201 filed on Jun. 8, 2018, including specification, drawings and claims is incorporated herein by reference in its entirety.

TECHNICAL FIELD

The present invention relates to a rotation speed control device.

BACKGROUND

In a motorcycle transmission, a so-called constant-mesh type transmission in which a plurality of gears is constantly in mesh is used (see Patent Document 1 for instance). The transmission disclosed in Patent Document 1 includes a counter shaft to which rotation of a crankshaft is transmitted via a clutch mechanism, and a drive shaft which transmits the rotation to the rear wheel which is a drive wheel via a drive chain. Moreover, a plurality of transmission gears having different numbers of teeth is provided on the two shafts, and the assemblage of the transmission gears is switched, whereby primary deceleration is performed.

In Patent Document 1, the transmission gears are composed of, for example, a gear configured to rotate integrally with one shaft, a slider gear provided so as to rotate integrally with the shaft and be able to slide on the other shaft along the axial direction, and a free gear provided on the other shaft so as to be able to freely rotate and idly rotate. These gears are constantly in mesh to rotate, and the side surfaces of the individual gears have dogs. For gear change, a shift cam is rotated by operating a change pedal arm, and a shift fork is slid by rotation of the shift cam. As a result, the dogs of the slider gear is engaged with the doges of a neighboring gear such that they can integrally rotate. Therefore, it is possible to switch the assemblage of the transmission gears.

[Patent Document 1] Japanese Patent Application Publication No. 2003-148615A

By the way, immediately after a rider performs a gear change operation, a state in which the dogs cannot be properly engaged with a gear which is the destination of gear change and bounce from it and which is called "gear disengagement" may occur. In this case, torque transmission between the engine and the drive wheel is interrupted, and the engine becomes a no-load state. In this case, for example, it is assumed that if the rider misunderstands that gear change has been completed (the dogs have been engaged) and operates the accelerator again such that the throttle valve becomes an open state, a rise in the engine rotation speed which is not intended by the rider occurs.

SUMMARY

It is therefore an object of the present disclosure is to provide a rotation speed control device capable of suppressing a rise in the rotation speed which is not intended by a rider during gear change.

According to an aspect of the embodiments of the present disclosure, there is provided an engine rotation speed control device for performing over-speed rotation prevention control to decrease an engine rotation speed if the engine rotation speed exceeds a first upper limit rotation speed, wherein if a gear position of a transmission is a neutral state or an intermediate neutral state in which predetermined gears are not engaged with each other in the middle of a gear change operation of the transmission, a second upper limit rotation speed which is lower than the first upper limit rotation speed is set, and wherein if the engine rotation speed at the time when the gear position of the transmission is the neutral state or the intermediate neutral state is higher than the second upper limit rotation speed, the over-speed rotation prevention control is performed.

According to another aspect of the embodiments of the present disclosure, there is provided a rotation speed control device for performing over-speed rotation prevention control to decrease an engine rotation speed by a throttle valve opening degree if the throttle valve opening degree exceeds a first upper limit throttle valve opening degree, wherein if a gear position of a transmission is a neutral state or an intermediate neutral state in which predetermined gears are not engaged with each other in the middle of a gear change operation of the transmission, a second upper limit throttle valve opening degree which is lower than the first upper limit throttle valve opening degree is set, and wherein if the throttle valve opening degree at the time when the gear position of the transmission is the neutral state or the intermediate neutral state is higher than the second upper limit throttle valve opening degree, the over-speed rotation prevention control is performed.

According to still another aspect of the embodiments of the present disclosure, there is provided a rotation speed control device for performing over-speed rotation prevention control to decrease a motor rotation speed if the motor rotation speed exceeds a first upper limit rotation speed, wherein if a gear position of a transmission is a neutral state or an intermediate neutral state in which predetermined gears are not engaged with each other in the middle of a gear change operation of the transmission, a second upper limit rotation speed which is lower than the first upper limit rotation speed is set, and wherein if the motor rotation speed at the time when the gear position of the transmission is the neutral state or the intermediate neutral state is higher than the second upper limit rotation speed, the over-speed rotation prevention control is performed.

According to the present disclosure, it is possible to suppress a rise in the rotation speed which is not intended by a rider during gear change.

DETAILED DESCRIPTION OF THE EMBODIMENTS

Hereinafter, embodiments of the present disclosure will be described in detail with reference to the accompanying drawings. Also, hereinafter, as an example of a vehicle to which an engine control system according to the present disclosure is applied, a motorcycle will be described; however, the application subject is not limited thereto, and can be changed. For example, the present disclosure can also be applied to other types of vehicles. Also, on the basis of the features and idea of the engine control system according to the present disclosure, the present disclosure can be applied to so-called "hybrid" vehicles each of which uses the combination of an engine and an electric motor. Also, it is possible to apply the above-mentioned over-speed rotation prevention control to electric motors which are used in "hybrid" vehicles and electric vehicles.

Figure 1:
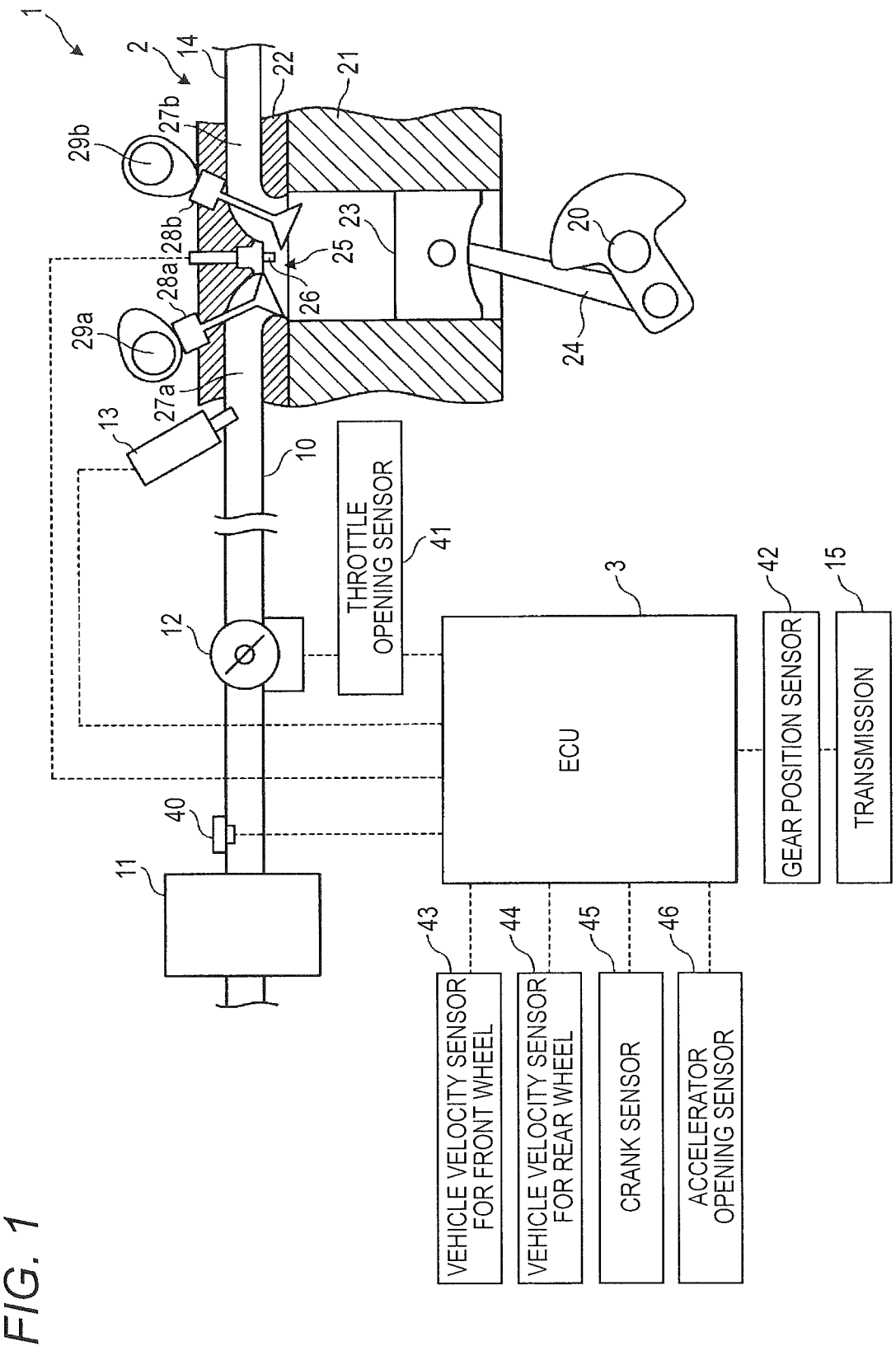
FIG. 1 is a view illustrating the overall configuration of an engine control system according to an embodiment.

With reference to FIG. 1, an engine control system according to an embodiment will be described. FIG. 1 is a view illustrating the overall configuration of the engine control system according to the present embodiment. However, the engine control system is not limited to the configuration to be described below, and can be appropriately modified.

As shown in FIG. 1, an engine control system 1 according to the present embodiment is configured to control the operations of an engine 2 which is an internal combustion engine and its peripheral components by an ECU (Electronic Control Unit) 3. The ECU 3 constitutes a rotation speed control device of this application, as will be described in detail below. The engine 2 is configured with, for example, a direct acting type multi-cylinder DOHC (Double Overhead Camshaft) engine. The engine 2 is configured to include a crankshaft 20 stored in a crankcase (not shown in the drawings), a cylinder 21, a cylinder head 22, and so on.

In the cylinder 21, a piston 23 is stored so as to be able to move forth and back in a predetermined direction (in FIG. 1, up and down). The crankshaft 20 and the piston 23 are connected by a con rod 24. In the engine 2, the piston 23 moves forth and back in the predetermined direction, whereby the crankshaft 20 is rotated via the con rod 24.

The internal space of the cylinder head 22 constitutes a combustion chamber 25. At an upper part of the combustion chamber 25, a spark plug 26 which is an ignition device is provided. The spark plug 26 ignites air-fuel mixture in the combustion chamber 25 at a predetermined timing on the basis of an ignition signal which is output from the ECU 3.

The cylinder head 22 has an intake port 27a and an exhaust port 27b connected to the combustion chamber 25. Also, the cylinder head 22 has an intake valve 28a and an exhaust valve 28b corresponding to the intake port 27a and the exhaust port 27b. The upper ends of the intake valve 28a and the exhaust valve 28b have an intake camshaft 29a and an exhaust camshaft 29b.

On the crankshaft 20, the intake camshaft 29a, and the exhaust camshaft 29b, a cam chain (not shown in the drawings) is laid. Rotation of the crankshaft 20 is transmitted to the intake camshaft 29a and the exhaust camshaft 29b via the cam chain. As the intake camshaft 29a and the exhaust camshaft 29b are rotated, the intake valve 28a and the exhaust valve 28b move forth and back with respect to the combustion chamber 25 at predetermined timings.

To the upstream end of the intake port 27a, an intake pipe 10 is connected via an intake manifold (not shown in the drawings). The passage in the intake pipe 10 and the intake port 27a constitute an intake passage for intake air. On some parts of the intake pipe 10, an air cleaner 11 and a throttle valve 12 are provided from the upstream side. On the part of the intake pipe 10 between the air cleaner 11 and the throttle valve 12, an air quantity sensor 40 is provided. The air quantity sensor 40 detects the quantity (mass flow rate) of intake air flowing in the intake pipe 10 through the air cleaner 11, and outputs the detection value to the ECU 3.

The throttle valve 12 is configured to include, for example, a butterfly valve, and is opened and closed according to commands of the ECU 3 to adjust the flow rate of intake air (the quantity of intake air) to flow in the intake pipe 10. On the throttle valve 12, a throttle opening sensor 41 is provided. The throttle opening sensor detects the degree of opening of the throttle valve 12, and outputs the detection value to the ECU 3.

On a part of the intake pipe 10 (or the intake port 27a) on the downstream side from the throttle valve 12, an injector 13 which is a fuel injection device for injecting fuel is provided. The injector 13 injects a predetermined quantity of fuel into the intake pipe 10 (or the intake port 27a) according to a command of the ECU 3. In other words, the engine 2 according to the present embodiment is configured with a so-called port injection type engine.

To the downstream end of the exhaust port 27b, an exhaust pipe 14 is connected via an exhaust manifold (not shown in the drawings). The exhaust port 27b and the passage in the intake pipe 10 constitute an exhaust passage for exhaust gas. To the exhaust pipe 14, a catalytic converter and a muffler (not shown in the drawings) are connected.

In the engine 2 which is configured as described above, intake air having passed through the air cleaner 11 is subjected to flow rate adjustment of the throttle valve 12, and then flows into the intake port 27a. At this time, fuel is injected from the injector 13 at a predetermined timing, whereby the intake air and the fuel are mixed in the intake port 27a. The air-fuel mixture of the intake air and the fuel enters the combustion chamber 25 at a timing when the intake valve 28a is open, and is compressed in the combustion chamber 25, and then is ignited at a predetermined timing by the spark plug 26. The exhaust gas ignited and burnt is discharged from the exhaust port 27b to the outside through the exhaust pipe 14.

Although not specifically shown in the drawings, a transmission 15 which is attached to the engine 2 is composed of a so-called constant-mesh type transmission in which a plurality of gears which forms pairs is constantly in mesh. Specifically, according to a gear change operation of the rider or control of the vehicle, in the transmission 15, the engagement members (the dogs) provided between the transmission gears and the transmission shaft (the drive shaft or the counter shaft) move so as to be engaged with each other, whereby transmission gears to perform power transmission is selected. However, in the present embodiment, so-called manual transmission in which gear change is performed according to a rider's operation will be described as an example.

Also, the way in which the rider operates the transmission 15 is kicking up or down a shift pedal provided in the vicinity of a foot pedal on which a foot is put (by an operation of kicking it up or down with a tiptoe, kicking it down with a tiptoe and a heel, or the like), and according to such operations, the gear position changes continuously. The pattern of change of the gear position can be expressed in the order of the first, N, second, third, fourth, fifth, and sixth gear positions from the lowest gear position (wherein N indicates the neutral gear position). Gear change is performed by an operation of kicking the shift pedal up or down, and if the shift pedal is repeatedly kicked up with a tiptoe, the gear position is consecutively shifted up. Meanwhile, if the shift pedal is repeatedly kicked down with a tiptoe, the gear position is consecutively shifted down.

Rotation of the engine 2 is converted at a transmission gear ratio according to the assemblage of a plurality of gears by the transmission 15, and is transmitted to a drive wheel (the rear wheel) via a predetermined transmission mechanism. Moreover, in the transmission 15, a gear position sensor 42 is provided. The gear position sensor 42 detects the gear position of the transmission 15, and outputs the detection value to the ECU 3. Specifically, the gear position sensor 42 detects the rotation angle of the shift cam (not shown in the drawings) almost continuously at intervals of a predetermined time and at intervals of a predetermined angle. The ECU 3 can determine the gear position (the first to sixth gear positions and the neutral gear position) on the basis of information on the rotation angle of the shift cam. However, the ECU 3 may determine the direction of the operation of the gear change (gear upshifting or gear downshifting) on the basis of temporal change of the above-mentioned rotation angle information.

Also, in the vehicle, a vehicle velocity sensor 43 for the front wheel, a vehicle velocity sensor 44 for the rear wheel, a crank sensor 45, and an accelerator opening sensor 46 are provided. The vehicle velocity sensor 43 for the front wheel detects the wheel rotation speed of the front wheel, and outputs the detection value to the ECU 3. The vehicle velocity sensor 44 for the rear wheel detects the wheel rotation speed of the rear wheel which is the drive wheel, and outputs the detection value to the ECU 3. The crank sensor 45 detects the phase of the crankshaft 20, and outputs the detection value to the ECU 3. The ECU 3 can calculates the engine rotation speed on the basis of those detection values.

The ECU 3 generally controls the operation of the whole vehicle including various components besides the engine 2. The ECU 3 is configured with a processor for performing various processes, a memory, and so on. The memory is configured with storage media such as a ROM (Read Only Memory), a RAM (Random Access Memory), and so on according to its use. In the memory, a control program for controlling the above-mentioned various components, and so on are stored. However, the ECU 3 may be configured with an ECM (Engine Control Module).

The ECU 3 determines the status of the vehicle from various sensors provided in the vehicle, and performs control on driving of the spark plug 26, the injector 13, the throttle valve 12, and so on. Also, the ECU 3 performs over-speed rotation prevention control to decrease the engine rotation speed under a predetermined condition, which will be described in detail below. The over-speed rotation prevention control means control to suppress an excessive rise in the engine rotation speed, and as examples, control such as fuel cut, fuel injection quantity adjustment, throttle valve opening adjustment, ignition timing adjustment, and misfire can be taken. If over-speed rotation prevention control is performed, the engine rotation speed is restricted to a predetermined rotation speed. Therefore, it is possible to prevent an excessive rise in the engine rotation speed.

By the way, constant-mesh type transmissions which are generally used in motorcycles switches the assemblage of transmission gears by engagement of dogs formed on the side surfaces of predetermined gears. However, immediately after a rider performs a gear change operation, a state in which the dogs cannot be properly engaged with a gear which is the destination of gear change and bounce from it and which is called "gear disengagement" may occur. In this case, torque transmission between the engine and the drive wheel is interrupted, and the engine becomes a no-load state (in this specification, also referred to as an intermediate neutral state). In this case, for example, it is assumed that if the rider misunderstands that gear change has been completed (the dogs have been engaged) and operates the accelerator again such that the throttle valve becomes an open state, a rise in the engine rotation speed which is not intended by the rider occurs.

Also, it can be assumed that the gear change timing and the acceleration timing depend on the driving characteristics of the rider. For example, when performing an upshifting operation in the middle of acceleration, the rider may open and close the accelerator in sync with a clutch operation. In this case, it is assumed that if the timing of the accelerator closing operation is off, the throttle valve becomes a slightly open state, whereby a rise in the engine rotation speed which is not intended by the rider occurs. Like this, if the clutch is engaged before an unintended rise in the engine rotation speed converges, torque higher than expected by the rider is transmitted to the drive wheel, and traveling after the gear change operation may not be smooth. Therefore, a control method capable of realizing smoother and more comfortable traveling by suppressing such an unintended rise in the engine rotation speed during a gear change operation is desired.

For this reason, the inventor of this application devised the present disclosure, in view of an upper limit engine rotation speed (hereinafter, referred to as the first upper limit rotation speed) which is generally set, and the gear position during a gear change operation. Specifically, in the present embodiment, if the gear position of the transmission 15 is the neutral state or the intermediate neutral state in which predetermined gears are not engaged with each other in the middle of a gear change operation of the transmission 15, the ECU 3 sets a second upper limit rotation speed which is lower than the first upper limit rotation speed. In other words, the ECU sets a limit lower than the upper limit rotation speed. Then, if the engine rotation speed at that time is higher than the second upper limit rotation speed, the ECU 3 performs predetermined over-speed rotation prevention control.

According to this configuration, even if the accelerator is opened before gears are engaged, since the over-speed rotation prevention control is performed, an excessive rise in the engine rotation speed is suppressed. In other words, an unintended rise in the engine rotation speed during a gear change operation is suppressed, and traveling after the gear change operation is stable, and smoother and more comfortable traveling becomes possible. Also, it is possible to prevent sudden increase of exhaust sound attributable to an unintended rise in the engine rotation speed, so a feeling of anxiety or discomfort is not given to the rider (or the surrounding people).

Also, not only in the case where the gear position is the neutral state, but also in the case where the gear position is the intermediate neutral state, the above-mentioned control is performed. Therefore, even though a gear change operation is performed at any gear position, an unintended rise in the engine rotation speed during the corresponding operation is suppressed. Therefore, it is possible to achieve the same effects as described above.

Figure 2:
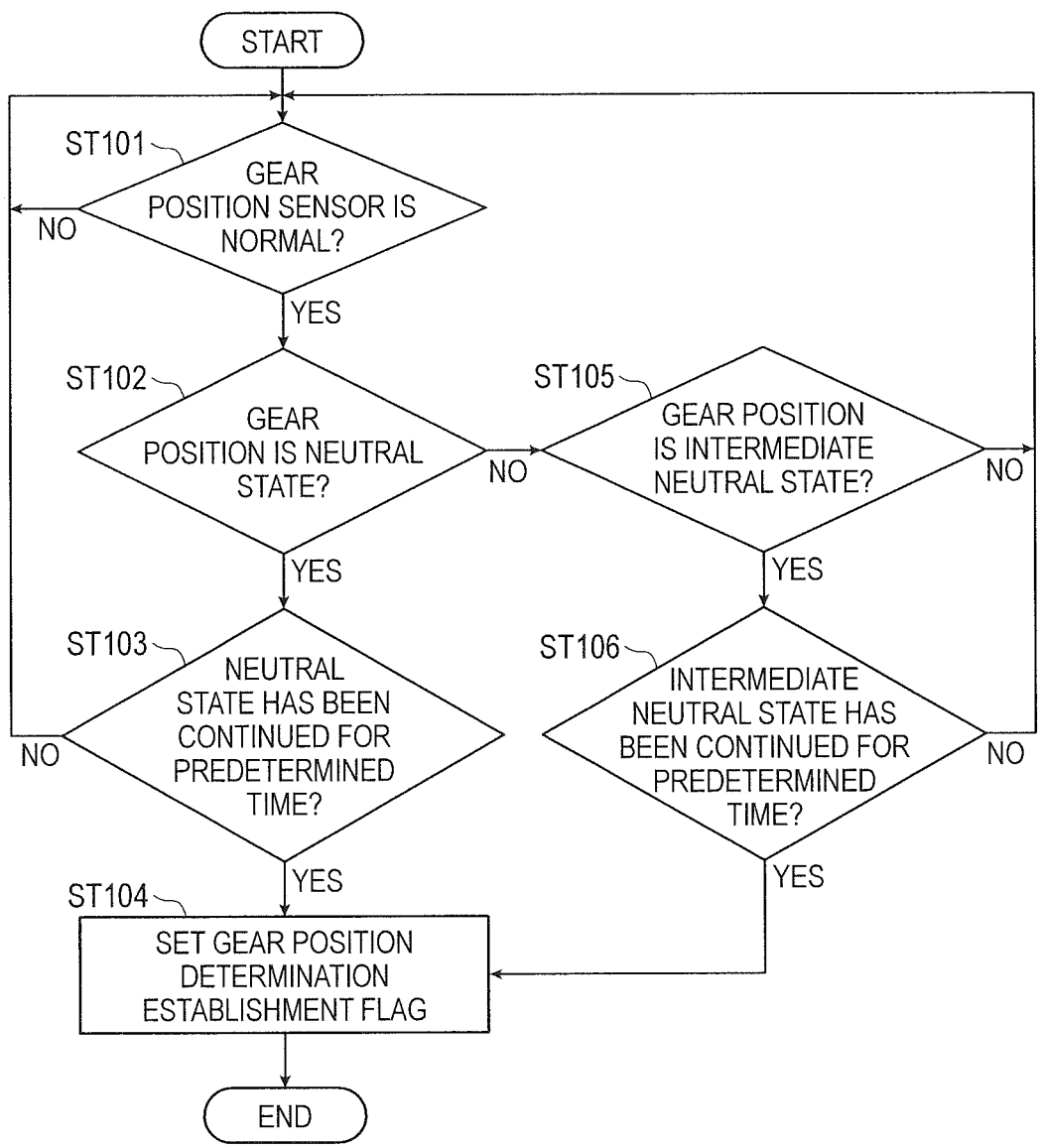
FIG. 2 is a view illustrating an example of a gear position determination establishment flow according to the embodiment.
Figure 3:
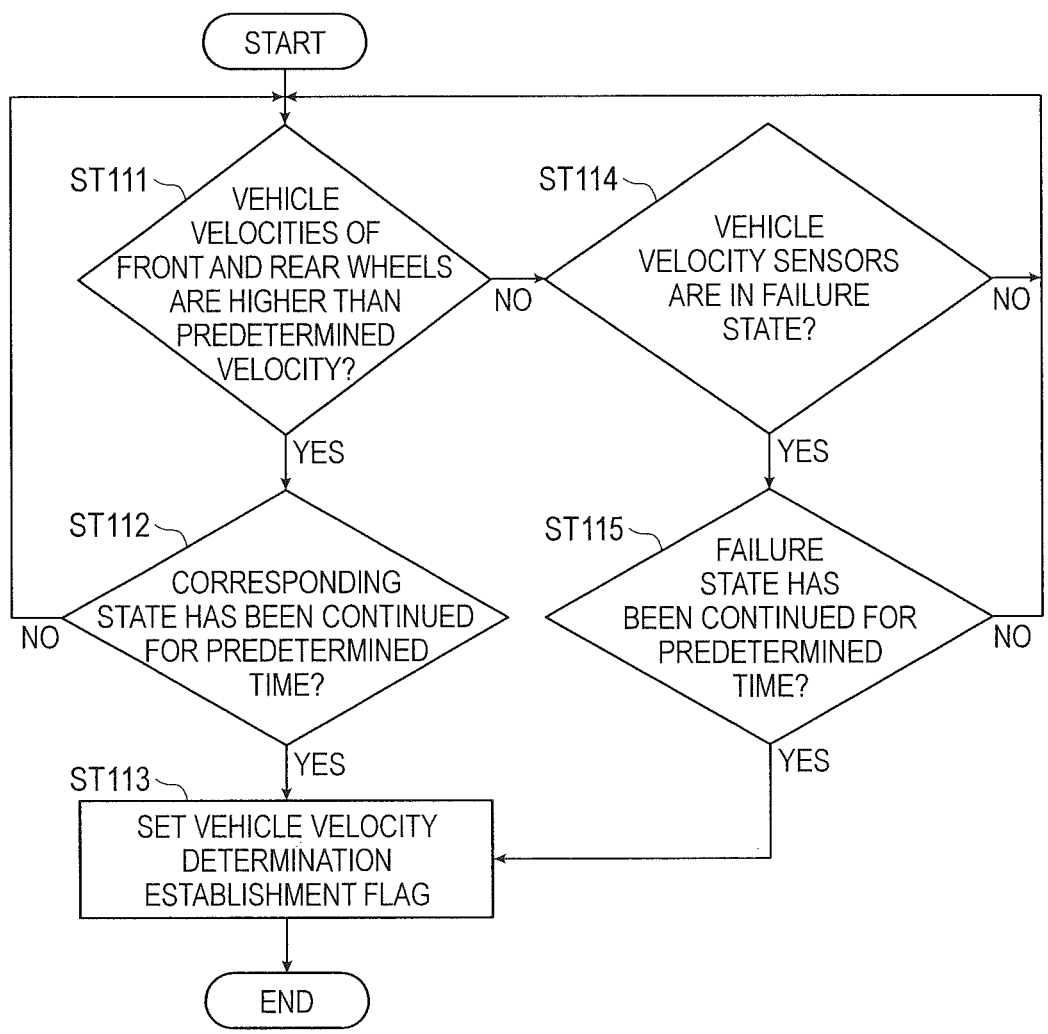
FIG. 3 is a view illustrating an example of a vehicle velocity determination establishment flow according to the embodiment.
Figure 4:
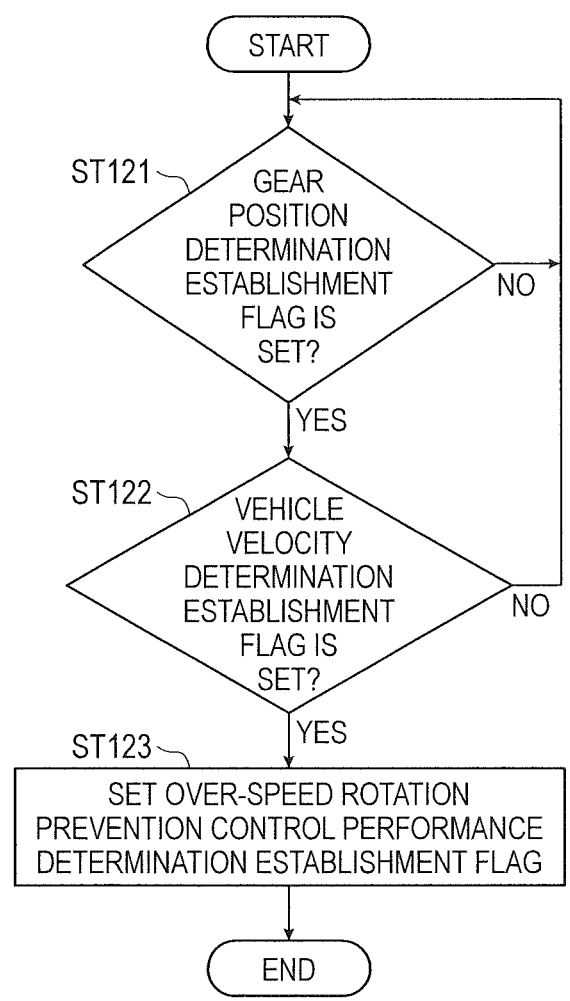
FIG. 4 is a view illustrating an example of an over-speed rotation prevention control performance determination establishment flow according to the embodiment.
Figure 5:
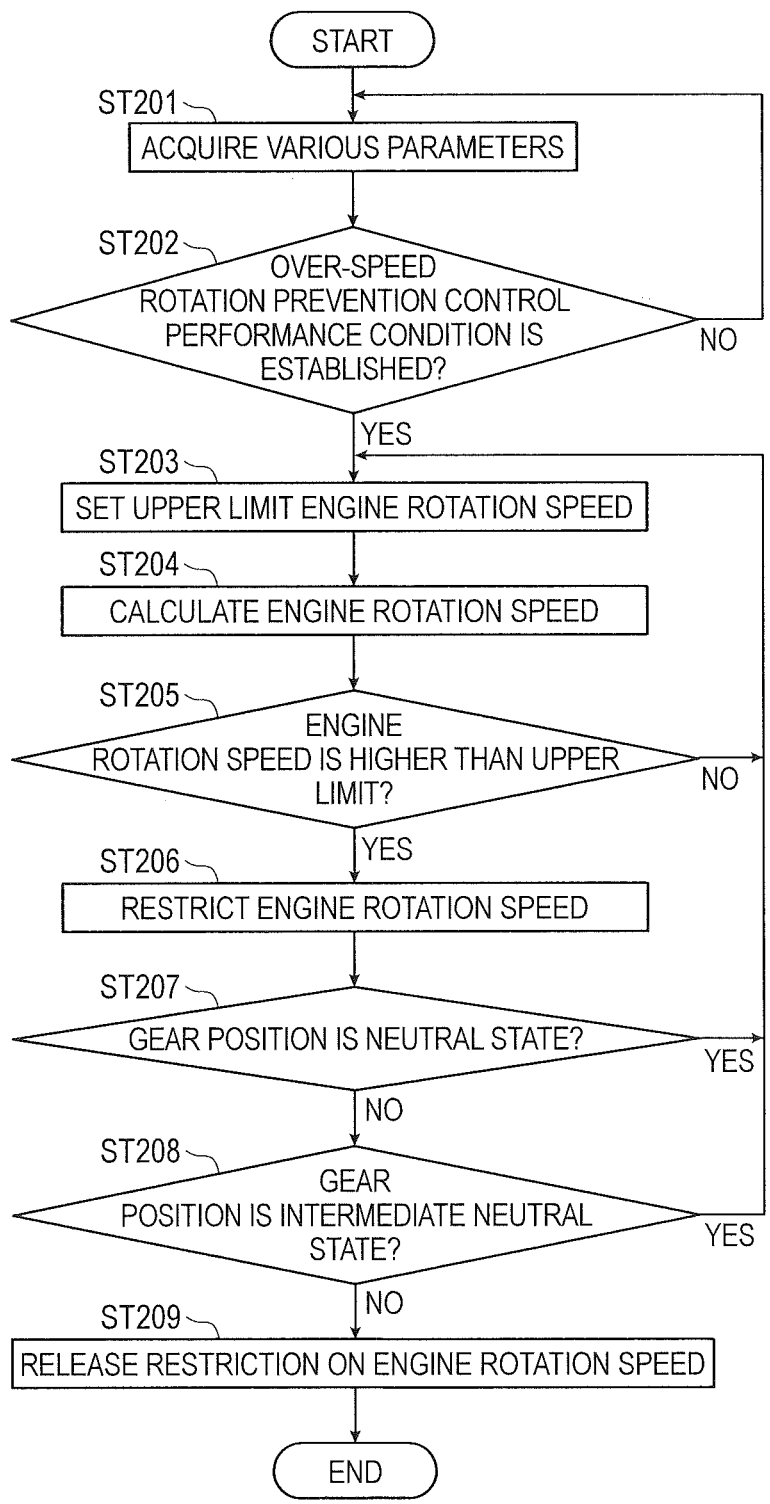
FIG. 5 is an over-speed rotation prevention control flow according to the embodiment.

Now, with reference to FIG. 2 to FIG. 5, a control flow according to the present embodiment will be described. FIG. 2 is a view illustrating an example of a gear position determination establishment flow according to the present embodiment. FIG. 3 is a view illustrating an example of a vehicle velocity determination establishment flow according to the present embodiment. FIG. 4 is a view illustrating an example of an over-speed rotation prevention control performance determination establishment flow according to the present embodiment. FIG. 5 is a view illustrating an example of an over-speed rotation prevention control flow according to the present embodiment. Also, in the control flow to be described below, unless explicitly described, the subject of operations (calculation (computing), determination, and so on) is the ECU.

First, the gear position determination establishment flow will be described. As shown in FIG. 2, if the flow is started, in STEP ST101, the ECU 3 determines whether the gear position sensor 42 is normal or not. If the gear position sensor 42 is normal ("YES" in STEP ST101), the ECU proceeds to the process of STEP ST102. If the gear position sensor 42 is not normal ("NO" in STEP ST101), the process of STEP ST101 is repeated.

In STEP ST102, the ECU 3 determines whether the gear position is the neutral state or not. If the gear position is the neutral state ("YES" in STEP ST102), the ECU proceeds to the process of STEP ST103. If the gear position is not the neutral state ("NO" in STEP ST102), the ECU proceeds to the process of STEP ST105.

In STEP ST103, the ECU 3 determines whether the neutral state has continued for a predetermined time, or not. If the neutral state has continued for the predetermined time ("YES" in STEP ST103), the ECU proceeds to the process of STEP ST104. If the neutral state has not continued for the predetermined time, in other words, predetermined gears have been engaged in mid-course ("NO" in STEP ST103), the ECU returns to the process of STEP ST101.

In STEP ST104, the ECU 3 determines that the gear position has been fixed in the neutral state, and sets a gear position determination establishment flag. Then, the gear position determination establishment flow ends.

In STEP ST105, the ECU 3 determines whether the gear position is the intermediate neutral state or not. Herein, the intermediate neutral state means a state where predetermined gears are not engaged in the middle of a gear change operation of the transmission 15, i.e. a disengagement state in which engagement members (dogs) are not engaged with a transmission gear. As an example, an intermediate state in which engagement of engagement members with one transmission gear has been released and the dogs are moving toward another transmission gear due to a gear change operation can be taken. Also, in the intermediate neutral state, a state where due to an incomplete gear change operation, dogs cannot be engaged with a transmission gear and engagement of dogs with a transmission gear has been released is included. If the gear position is the intermediate neutral state ("YES" in STEP ST105), the ECU proceeds to the process of STEP ST106. If the gear position is not the intermediate neutral state ("NO" in STEP ST105), the ECU proceeds to the process of STEP ST106.

In STEP ST106, the ECU 3 determines whether the intermediate neutral state has continued for a predetermined time, or not. If the intermediate neutral state has continued for the predetermined time ("YES" in STEP ST106), the ECU proceeds to the process of STEP ST104. If the intermediate neutral state has not continued for the predetermined time, in other words, the predetermined gears have been engaged in mid-course ("NO" in STEP ST105), the ECU proceeds to the process of STEP ST101.

Now, the vehicle velocity determination establishment flow will be described. As shown in FIG. 3, if the flow is started, in STEP ST111, the ECU 3 determines whether the vehicle velocities of the front and rear wheels are higher than a predetermined velocity or not. If the vehicle velocities of the front and rear wheels are higher than the predetermined velocity ("YES" in STEP ST111), the ECU proceeds to the process of STEP ST112. If the vehicle velocities of the front and rear wheels are equal to or lower than the predetermined velocity ("NO" in STEP ST111), the ECU proceeds to the process of STEP ST114.

In STEP ST112, the ECU 3 determines whether the above-mentioned state has continued, i.e. the vehicle velocities of the front and rear wheels have been higher than the predetermined velocity, for a predetermined time, or not. If the vehicle velocities of the front and rear wheels have been higher than the predetermined velocity for the predetermined time ("YES" in STEP ST112), the ECU proceeds to the process of STEP ST113. If the vehicle velocities of the front and rear wheels have not been higher than the predetermined velocity for the predetermined time, in other words, the vehicle velocities have become equal to or lower than the predetermined velocity in mid-course ("NO" in STEP ST112), the ECU returns to the process of STEP ST111.

In STEP ST113, the ECU 3 determines that the vehicle velocities of the front and rear wheels have been fixed at the predetermined velocity, and sets a vehicle velocity determination establishment flag. Then, the vehicle velocity determination establishment flow ends.

In STEP ST114, the ECU 3 determines whether the vehicle velocity sensors (the vehicle velocity sensor 43 for the front wheel and the vehicle velocity sensor 44 for the rear wheel) are in a failure state or not. Herein, the failure state of the vehicle velocity sensors means a state where the vehicle velocity sensors cannot normally detect the vehicle velocity. If the vehicle velocity sensors are in the failure state ("YES" in STEP ST114), the ECU proceeds to the process of STEP ST115. If the vehicle velocity sensors are not in the failure state ("NO" in STEP ST114), the ECU returns to the process of STEP ST111. Also, in an example, determination on whether the vehicle velocity sensors are in the failure state is performed by self-diagnosis of the ECU 3.

In STEP ST115, the ECU 3 determines whether the failure state of the vehicle velocity sensors has continued for a predetermined time or not. If the failure state of the vehicle velocity sensors has continued for the predetermined time ("YES" in STEP ST115), the ECU proceeds to the process of STEP ST113. If the failure state of the vehicle velocity sensors has not continued for the predetermined time, in other words, the vehicle velocity sensors have got out of the failure state in mid-course ("NO" in STEP ST115), the ECU returns to the process of STEP ST111.

Now, the over-speed rotation prevention control performance determination establishment flow will be described. As shown in FIG. 4, if the flow is started, in STEP ST121, the ECU 3 determines whether the gear position determination establishment flag has been set or not. The gear position determination establishment flag is as described with reference to FIG. 2. If the gear position determination establishment flag has been set ("YES" in STEP ST121), the ECU proceeds to the process of STEP ST122. If the gear position determination establishment flag has not been set ("NO" in STEP ST121), the ECU returns to the process of STEP ST121.

In STEP ST122, the ECU 3 determines whether the vehicle velocity determination establishment flag has been set or not. The vehicle velocity determination establishment flag is as described with reference to FIG. 3. If the vehicle velocity determination establishment flag has been set ("YES" in STEP ST122), the ECU proceeds to the process of STEP ST123. If the vehicle velocity determination establishment flag has not been set ("NO" in STEP ST122), the ECU returns to the process of STEP ST121.

In STEP ST123, the ECU 3 determines that it is possible to perform the over-speed rotation prevention control, and sets an over-speed rotation prevention control performance determination establishment flag. Then, the over-speed rotation prevention control performance determination establishment flow ends. Like this, via the flows of FIG. 2 to FIG. 4, a condition under which the over-speed rotation prevention control according to the present embodiment can be performed is established.

Now, with reference to FIG. 5, the over-speed rotation prevention control flow according to the present embodiment will be described. As shown in FIG. 5, if the flow is started, in STEP ST201, the ECU 3 acquires or calculates various parameters from the sensors provided in the vehicle. For example, the ECU 3 acquires the vehicle velocities of the front and rear wheels from the vehicle velocity sensor 43 for the front wheel and the vehicle velocity sensor 44 for the rear wheel, and calculates the gear position from the detection value of the gear position sensor 42. Then, the ECU proceeds to the process of STEP ST202.

In STEP ST202, the ECU 3 determines whether the over-speed rotation prevention control performance condition has been established or not. Specifically, the ECU 3 determines whether the over-speed rotation prevention control performance determination establishment flag has been set or not. The over-speed rotation prevention control performance determination establishment flag is as described with reference to FIG. 4. If the over-speed rotation prevention control performance determination establishment flag has been set ("YES" in STEP ST202), the ECU proceeds to the process of STEP ST203. If the over-speed rotation prevention control performance determination establishment flag has not been set ("NO" in STEP ST202), the ECU returns to the process of STEP ST201.

In STEP ST203, the ECU 3 sets an upper limit engine rotation speed. Specifically, the ECU 3 acquires an upper limit engine rotation speed corresponding to the vehicle velocity of the rear wheel, from a predetermined map defined in advance, and sets the upper limit engine rotation speed. Also, the upper limit engine rotation speed which is set in this stage is a second upper limit rotation speed which is lower than the first upper limit rotation speed. Subsequently, the ECU proceeds to the process of STEP ST204.

In STEP ST204, the ECU 3 detects the phase of the crankshaft 20 from the crank sensor 45, and calculates the engine rotation speed on the basis of the detection value. Then, the ECU proceeds to the process of STEP ST205.

In STEP ST205, the ECU 3 determines whether the engine rotation speed is higher than the second upper limit rotation speed or not. If the engine rotation speed is higher than the second upper limit rotation speed ("YES" in STEP ST205), the ECU proceeds to the process of STEP ST206. If the engine rotation speed is equal to or lower than the second upper limit rotation speed ("NO" in STEP ST205), the ECU returns to the process of STEP ST203. At this time, if the over-speed rotation prevention control to be described below is being performed, the ECU interrupts the over-speed rotation prevention control.

In STEP ST206, the ECU 3 restricts the engine rotation speed. Specifically, the ECU 3 performs the over-speed rotation prevention control to decrease the engine rotation speed. As examples of the over-speed rotation prevention control, as described above, fuel cut, fuel injection quantity adjustment, throttle valve opening adjustment, ignition timing adjustment, misfire, and so on can be taken. Therefore, an excessive rise in the engine rotation speed is suppressed. Subsequently, the ECU proceeds to the process of STEP ST207.

In STEP ST207, the ECU 3 determines whether the gear position is the neutral state or not. If the gear position is not the neutral state ("NO" in STEP ST207), the ECU proceeds to the process of STEP ST208. If the gear position is the neutral state ("YES" in STEP ST207), the ECU returns to the process of STEP ST203.

In STEP ST208, the ECU 3 determines whether the gear position is the intermediate neutral state or not. If the gear position is not the intermediate neutral state ("NO" in STEP ST208), the ECU proceeds to the process of STEP ST209. If the gear position is the intermediate neutral state ("YES" in STEP ST208), the ECU returns to the process of STEP ST203.

In STEP ST209, the ECU 3 determines that the gear change operation of the transmission 15 has been completed, and releases the restriction on the engine rotation speed. In other words, the ECU 3 ends the over-speed rotation prevention control. Therefore, the flow ends.

Like this, in the present embodiment, if the gear position during the gear change operation is the neutral state or the intermediate neutral state, the ECU 3 sets the second upper limit rotation speed which is lower than the first upper limit rotation speed, so the engine rotation speed is suppressed from exceeding the second upper limit rotation speed. As a result, it is possible to suppress a rise in the engine rotation speed which is not intended by the rider, during gear change.

Especially, when an upper limit engine rotation speed is set in STEP ST203, it is desirable that a higher second upper limit rotation speed should be set as the vehicle velocity increase. According to change of the rotation speed of the transmission shaft or transmission gear on the drive wheel side attributable to change of the vehicle velocity, for example, in the case of relatively low velocity, a low second upper limit rotation speed is set such that the engine rotation speed is kept low, whereby it is possible to decrease the rotation speed difference from the drive wheel side. Meanwhile, if the velocity of the vehicle is relatively high, a second upper limit rotation speed which is higher than that in the case of low velocity is set such that a state where the engine rotation speed is high is allowed. Therefore, even if the rotation speed of the transmission shaft or the transmission gear on the drive wheel side is high, without decreasing the engine rotation speed, it is possible to decrease the rotation speed difference between them. Like this, since an upper limit engine rotation speed capable of coping with the wheel speed of the drive wheel side is set, in every vehicle velocity range, it is possible to keep the rotation speed difference between the engine side and the drive wheel side small, and smoother and more comfortable traveling after a gear change operation becomes possible.

Figure 6:
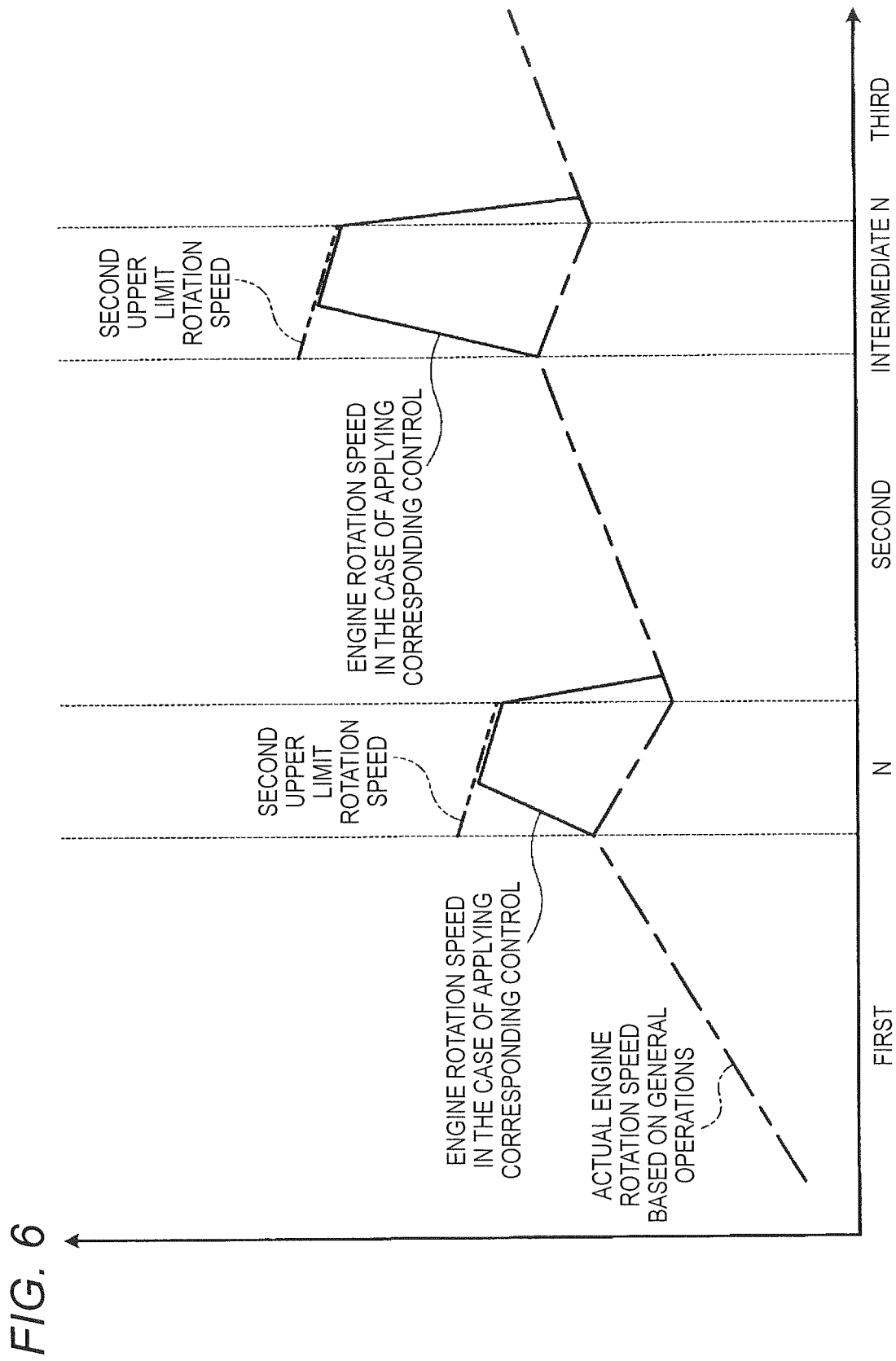
FIG. 6 is a time chart illustrating temporal change of engine rotation speed in the case of applying over-speed rotation prevention control according to the embodiment.

FIG. 6 is a time chart illustrating temporal change of the engine rotation speed in the case of applying the over-speed rotation prevention control according to the present embodiment. in FIG. 6, the horizontal axis represents the gear position which is switched with time, and the vertical axis represents the engine rotation speed. Also, in FIG. 6, N represents the neutral gear position, and intermediate N represents the intermediate neutral position. Also, in FIG. 6, solid lines represent the engine rotation speed in the case of applying the above-mentioned control in a state where the accelerator is being opened between the neutral gear position and the intermediate neutral position or the throttle valve is being opened, and an alternate long and short dash line represents the actual engine rotation speed based on general operations, and alternate long and two short dashes lines represent second upper limit rotation speeds.

As shown in FIG. 6, in the neutral state and the intermediate neutral state, a second upper limit rotation speed based on the vehicle velocity of the rear wheel is set. In the neutral state and the intermediate neutral state, since the vehicle velocity of the rear wheel tends to decrease, as the vehicle velocity decreases, a lower second upper limit speed is set. Therefore, even if a throttle operation is performed in the neutral state and the intermediate neutral state, it is possible to prevent change of the engine rotation speed such as change to a speed higher than a second upper limit rotation speed, and it is possible to minimize the difference between the engine rotation speed before gear change and the engine rotation speed after gear change. As a result, smooth and comfortable traveling after the gear change operation becomes possible.

In the present embodiment, the port injection type engine 2 has been described as an example; however, the present disclosure is not limited to this configuration. For example, a direct injection type engine 2 may be used.

Also, in the present embodiment, the gasoline engine has been described as an example; however, the present disclosure is not limited thereto. The above-mentioned control can also be applied to diesel engines.

Also, in the above-described embodiment, the DOHC engine has been described as an example; however, the present disclosure is not limited thereto. The engine 2 may be a SOHC (Single OverHead Camshaft) engine.

Also, in the present embodiment, the case where in the flow shown in FIG. 5, a second upper limit rotation speed is set on the basis of the vehicle velocity (the vehicle velocity of the rear wheel) has been described; however, the present disclosure is not limited to this configuration. Hereinafter, with respect to FIG. 7 to FIG. 12, modifications of the method of setting a second upper limit rotation speed will be described.

Figure 7:
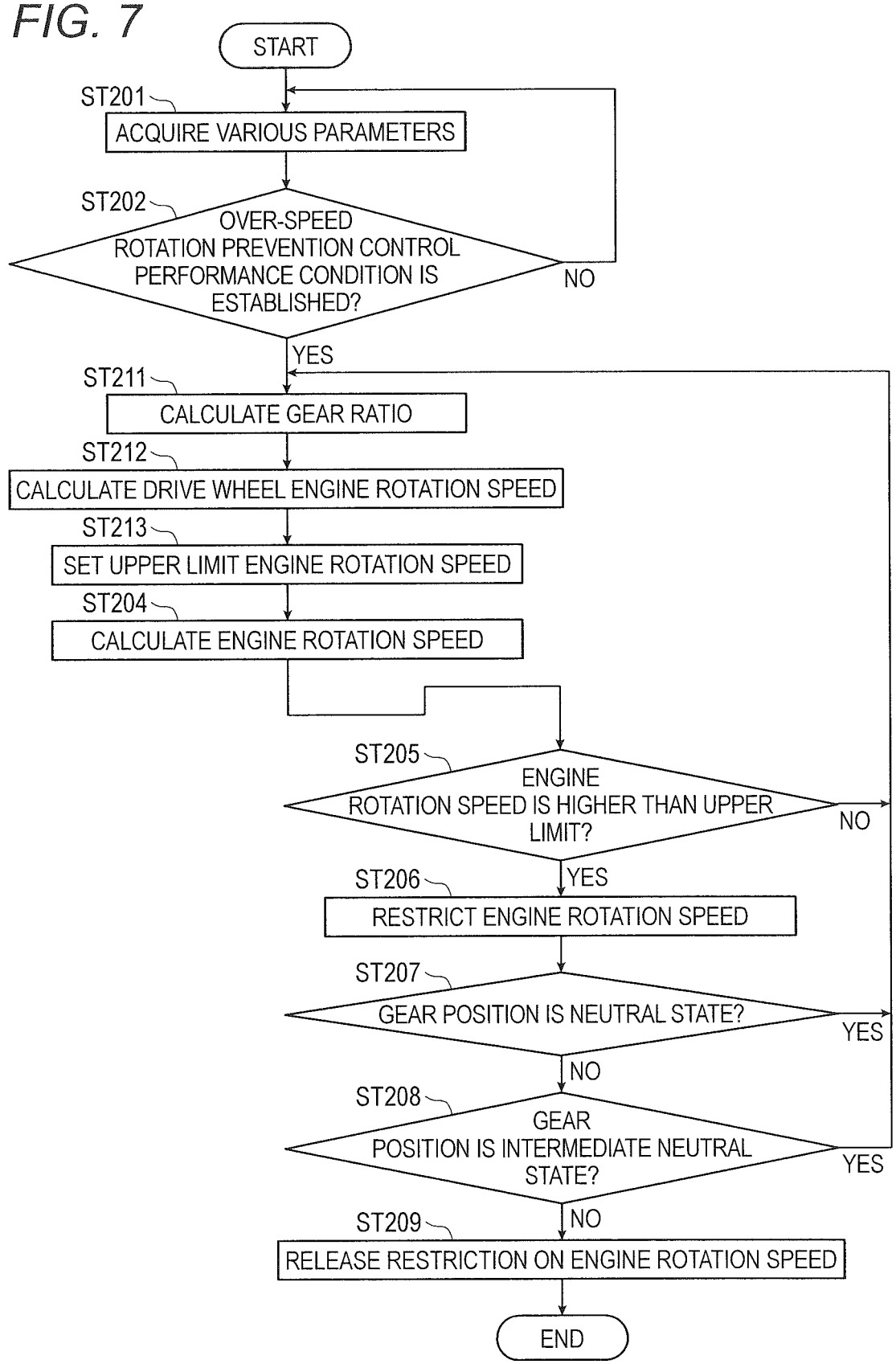
FIG. 7 is a view illustrating an over-speed rotation prevention control flow according to a first modification.

FIG. 7 is a view illustrating an over-speed rotation prevention control flow according to a first modification. In the following modification, since it is different from FIG. 5 only in the flow for setting a second upper limit rotation speed, the difference will be mainly described, and the others are appropriately omitted.

As shown in FIG. 7, in STEP ST211 which is performed after the over-speed rotation prevention control performance condition is established ("YES" in STEP ST202), the ECU 3 calculates the gear ratio. Specifically, the ECU 3 calculates the gear ratio according to the gear position previously calculated in STEP ST201. Then, the ECU proceeds to the process of STEP ST212.

In STEP ST212, the ECU 3 calculates the drive wheel engine rotation speed (also referred to as the estimate engine rotation speed) on the basis of the vehicle velocity of the rear wheel and the gear ratio. The drive wheel engine rotation speed is different from the engine rotation speed which is calculated from the output of the crank sensor 45. Subsequently, the ECU proceeds to the process of STEP ST213.

In STEP ST213, the ECU 3 sets an upper limit engine rotation speed (a second upper limit rotation speed which is lower than the first upper limit rotation speed). Specifically, the ECU 3 acquires a rotation speed correction value defined in a predetermined map on the basis of the vehicle velocity of the rear wheel, and sets a value obtained by adding the rotation speed correction value to the drive wheel engine rotation speed, as a second upper limit rotation speed. Then, the ECU proceeds to the process of STEP ST204.

Like this, in the first modification, a second upper limit rotation speed is set on the basis of the wheel speed of the drive wheel and the gear ratio. According to this configuration, since a second upper limit rotation speed is set on the basis of the wheel speed of the drive wheel and the gear ratio, it is possible to set a more appropriate second upper limit rotation speed based on the engine rotation speed in a normal drive power transmission state, as compared to FIG. 5. Therefore, it is possible to better keep the rotation speed difference between the engine side and the drive wheel side small, and smoother and more comfortable traveling after the gear change operation becomes possible.

Figure 8:
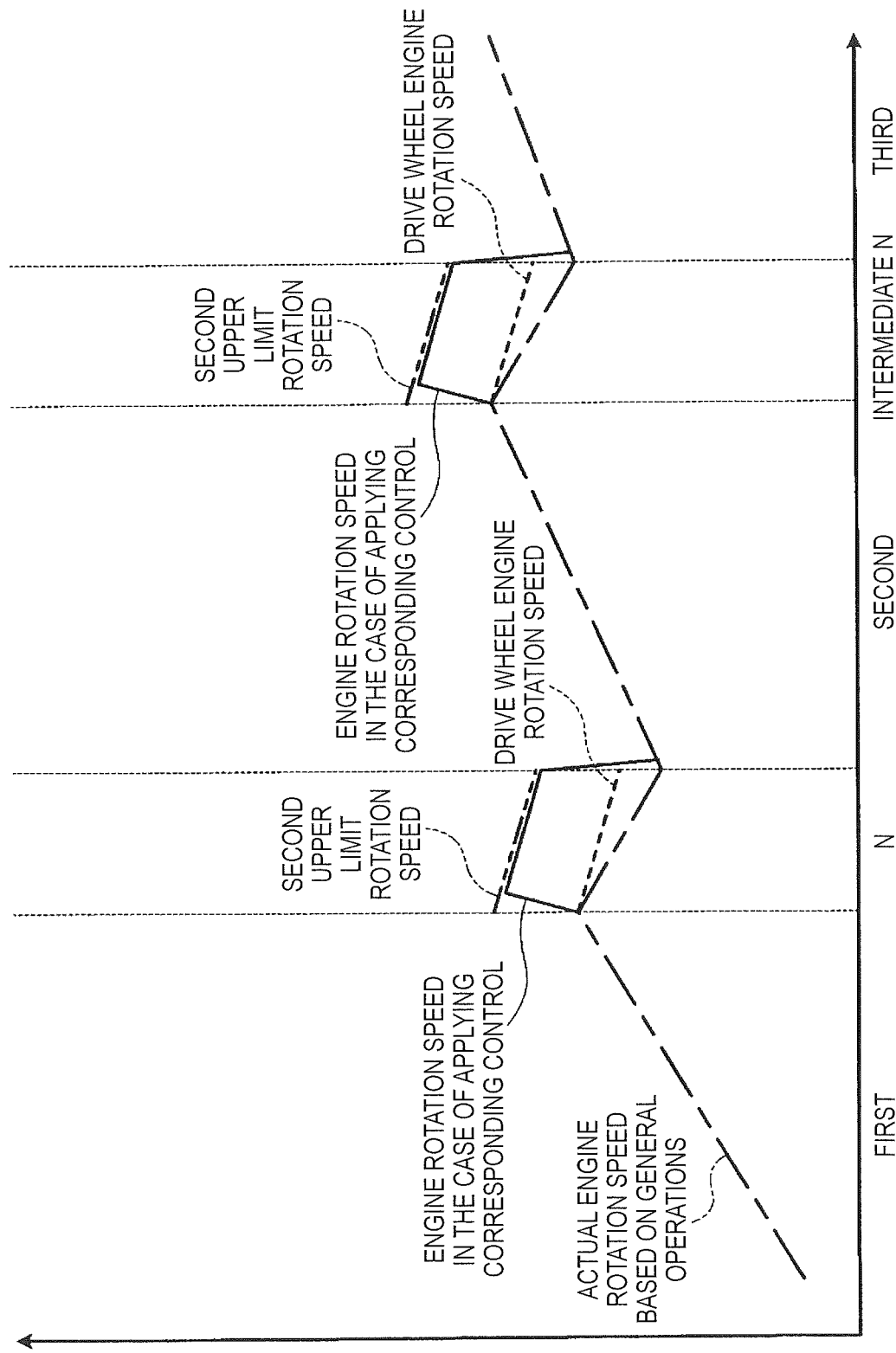
FIG. 8 is a time chart illustrating temporal change of engine rotation speed corresponding to FIG. 7.

FIG. 8 is a time chart illustrating temporal change of the engine rotation speed corresponding to FIG. 7. In FIG. 8, the horizontal axis and vertical axis correspond to those of FIG. 6, and the types of lines correspond to those of FIG. 6. Also, broken lines shown in FIG. 8 represent the drive wheel engine rotation speed which is calculated on the basis of the vehicle velocity of the rear wheel and the gear ratio.

As shown in FIG. 8, in the neutral state and the intermediate neutral state, a second upper limit rotation speed based on the vehicle velocity of the rear wheel is set. In the neutral state and the intermediate neutral state, since the vehicle velocity of the rear wheel tends to decrease, as the vehicle velocity decreases, a lower second upper limit speed is set. Also, a second upper limit rotation speed which is higher than the above-mentioned drive wheel engine rotation speed (the estimate engine rotation speed) by a predetermined value is set. In the corresponding modification, even if a throttle operation is performed in the neutral state and the intermediate neutral state, it is possible to prevent change of the engine rotation speed such as change to a speed higher than a second upper limit rotation speed, and it is possible to minimize the difference between the engine rotation speed before gear change and the engine rotation speed after gear change. As a result, smooth and comfortable traveling after the gear change operation becomes possible.

Also, in FIG. 7, the case of setting a second upper limit rotation speed on the basis of the vehicle velocity of the rear wheel and the gear ratio has been described; however, the present disclosure is not limited to this configuration. The ECU 3 may set a second relative velocity on the basis of only the current gear position. In this case, it is desirable that a higher second upper limit rotation speed should be set as the gear position is shift up. In other words, as the current gear position is shifted down (toward the first gear position), a lower second upper limit rotation speed is set, and as the gear position is shifted up (toward the sixth gear position), a higher second upper limit rotation speed is set.

In general, as the gear position is shifted up, the available speed range of the engine shifts to the high speed side, and the available speed range if the gear position is low is on the low-speed rotation side. According to this configuration, for example, in the case of low speed, since a low second upper limit rotation speed is set such that the engine rotation speed is kept low, it is possible to decrease the rotation speed difference from the drive wheel side. Meanwhile, in the case of high-speed gear mainly using a high-speed rotation range, a higher second upper limit rotation speed is set as compared to the case of low speed, so as to allow the state where the engine rotation speed is high. Therefore, even if the rotation speed of the transmission shaft or transmission gear on the drive wheel side is high, without uselessly decreasing the engine rotation speed, it is possible to decrease the rotation speed difference between them. Like this, since an upper limit engine rotation speed capable of coping with the rotation speed of the transmission shaft or transmission gear on the drive wheel side is set, it is possible to keep the rotation speed difference between the engine side and the drive wheel side small, and smoother and more comfortable traveling after the gear change operation becomes possible.

Also, a second upper limit rotation speed may be set on the basis of the engine rotation speed detected at the time of a gear change operation. In other words, the ECU 3 acquires the engine rotation speed if a gear change operation is detected, and sets it as a second upper limit rotation speed. According to this configuration, an unintended rise in the engine rotation speed during a gear change operation is suppressed. Therefore, it is possible to keep the rotation speed difference between the engine side and the drive wheel side small, and smoother and more comfortable traveling after the gear change operation becomes possible.

Figure 9:
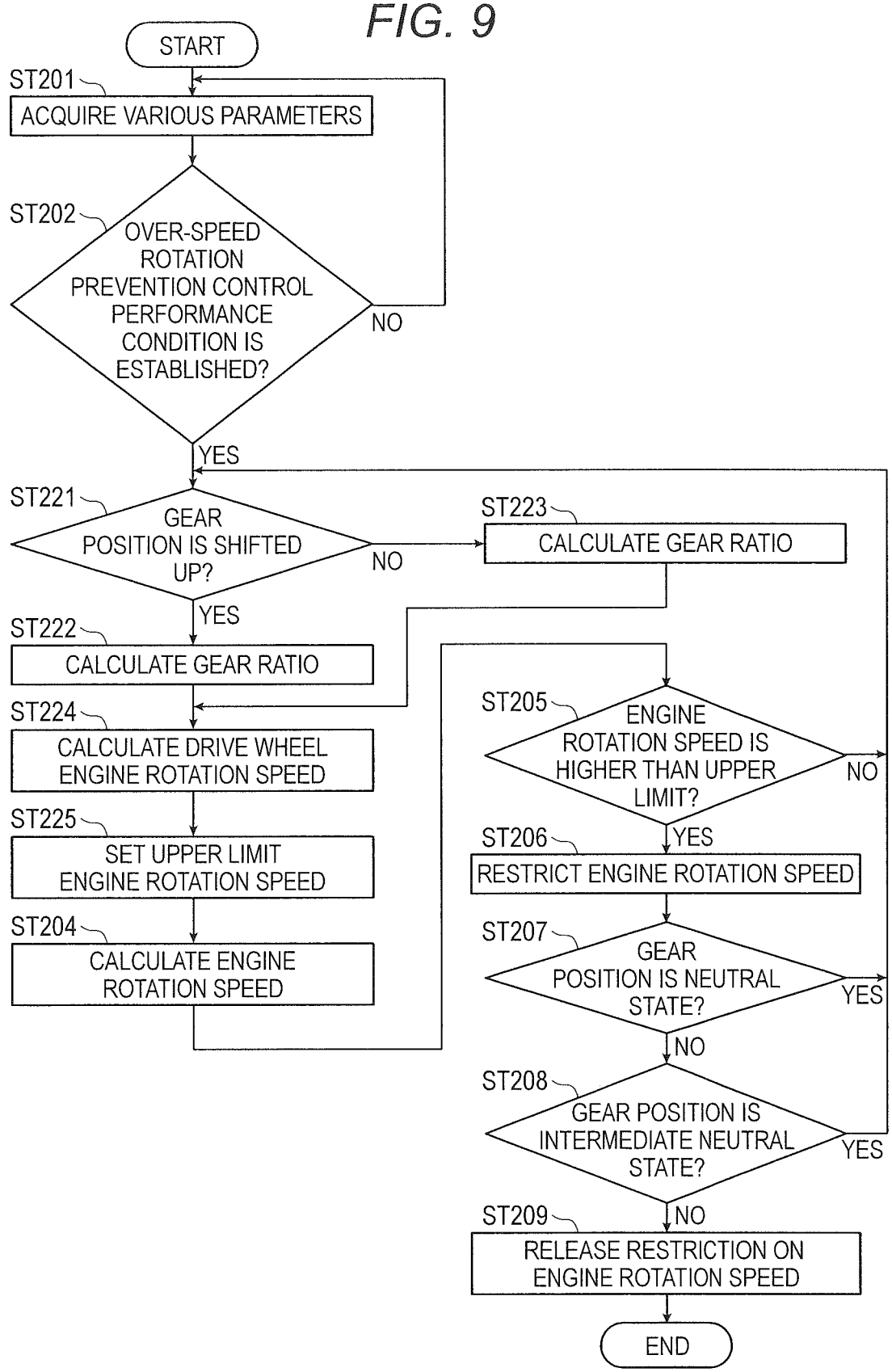
FIG. 9 is a view illustrating an over-speed rotation prevention control flow according to a second modification.

FIG. 9 is a view illustrating an over-speed rotation prevention control flow according to a second modification. In the second modification, a second upper limit rotation speed is set on the basis of the wheel speed of the drive wheel and the gear position to be set after the gear change operation. Specifically, as shown in FIG. 9, in STEP ST220 which is performed after the over-speed rotation prevention control performance condition is established ("YES" in STEP ST202), the ECU 3 determines whether the gear position has been shifted up or not. If the gear position has been shifted up ("YES" in STEP ST221), the ECU proceeds to the process of STEP ST222. If the gear position has not been shifted up ("NO" in STEP ST221), i.e. if the gear position has been shifted down, the ECU proceeds to the process of STEP ST223.

In STEP ST222, the ECU 3 calculates the gear ratio. Specifically, the ECU 3 calculates the gear ratio according to the next higher gear position to be set after the gear upshifting. Then, the ECU proceeds to the process of STEP ST224. In STEP ST223, the ECU 3 calculates the gear ratio according to the next lower gear position to be set after the gear downshifting. Then, the ECU proceeds to the process of STEP ST224.

In STEP ST224, the ECU 3 calculates the drive wheel engine rotation speed (also referred to as the estimate engine rotation speed) on the basis of the vehicle velocity of the rear wheel and the gear ratio. The drive wheel engine rotation speed is different from the engine rotation speed which is calculated from the output of the crank sensor 45. Then, the ECU proceeds to the process of STEP ST225.

In STEP ST225, the ECU 3 sets an upper limit engine rotation speed (a second upper limit rotation speed which is lower than the first upper limit rotation speed). Specifically, the ECU 3 acquires a rotation speed correction value defined in a predetermined map on the basis of the vehicle velocity of the rear wheel, and sets a value obtained by adding the rotation speed correction value to the drive wheel engine rotation speed, as a second upper limit rotation speed. Then, the ECU proceeds to the process of STEP ST204.

Like this, in the second modification, a second upper limit rotation speed is set on the basis of the wheel speed of the drive wheel and the gear position to be set after the gear change operation. Specifically, the ECU 3 calculates an estimate engine rotation speed corresponding to the next gear position, from the result of determination on the current and next gear positions, and sets a value obtained by adding a predetermined correction value to the estimate engine rotation speed, as a second upper limit rotation speed. Here, the correction value is positive, and is given from a map set in advance, on the basis of the wheel speed of the rear wheel and the current and next gear positions. In this case, setting for forcibly decreasing the engine rotation speed by control during gear upshifting is possible.

According to this configuration, on the basis of the estimate engine rotation speed at the time of completion of gear change, it is possible to set an appropriate upper limit engine rotation speed for an engine rotation speed variation pattern according to each of upshifting and downshifting of the gear position. Therefore, it is possible to better keep the rotation speed difference between the engine side and the drive wheel side small, and smoother and more comfortable traveling after the gear change operation becomes possible.

Figure 10:
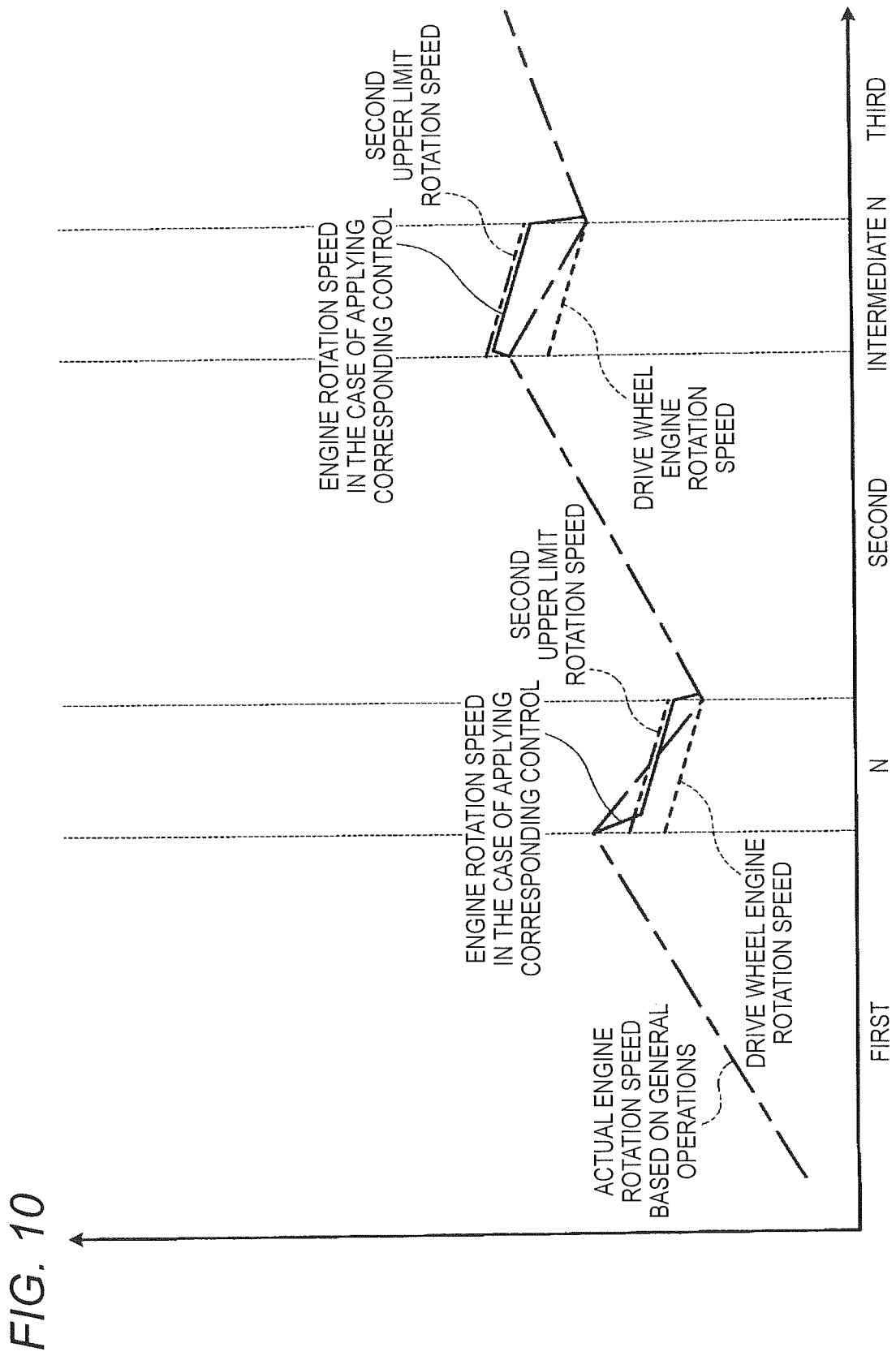
FIG. 10 is a time chart illustrating temporal change of engine rotation speed corresponding to FIG. 9.

FIG. 10 is a time chart illustrating temporal change of the engine rotation speed corresponding to FIG. 9. In FIG. 10, the horizontal axis and vertical axis correspond to those of FIG. 6, and the types of lines correspond to those of FIG. 6. Also, broken lines shown in FIG. 10 represent the drive wheel engine rotation speed which is calculated on the basis of the vehicle velocity of the rear wheel and the gear ratio.

As shown in FIG. 10, in the neutral state and the intermediate neutral state, a second upper limit rotation speed based on the vehicle velocity of the rear wheel is set. In the neutral state and the intermediate neutral state, since the vehicle velocity of the rear wheel tends to decrease, as the vehicle velocity decreases, a lower second upper limit speed is set. Also, a second upper limit rotation speed which is higher than the above-mentioned drive wheel engine rotation speed (the estimate engine rotation speed) by a predetermined value is set. In the corresponding modification, even if a throttle operation is performed in the neutral state and the intermediate neutral state, it is possible to prevent change of the engine rotation speed such as change to a speed higher than a second upper limit rotation speed, and it is possible to minimize the difference between the engine rotation speed before gear change and the engine rotation speed after gear change. As a result, smooth and comfortable traveling after the gear change operation becomes possible.

Especially, in FIG. 10, in the case of the neutral gear position, a second upper limit rotation speed which is lower than the previous engine rotation speed (at the first gear position) and slightly higher than the engine rotation speed (at the second gear position) after gear change is set. Therefore, from the previous engine rotation speed, the rotation speed automatically decreases, so an unintended rise in the engine rotation speed does not occur. Further, the engine rotation speed smoothly approaches the engine rotation speed after gear change. Therefore, even after gear change, it is possible to continue acceleration without a feeling of discomfort. Moreover, this setting is more effective when it is used on the "low-speed gear side" on which variation in the engine rotation speed during gear change is significant.

Figure 11:
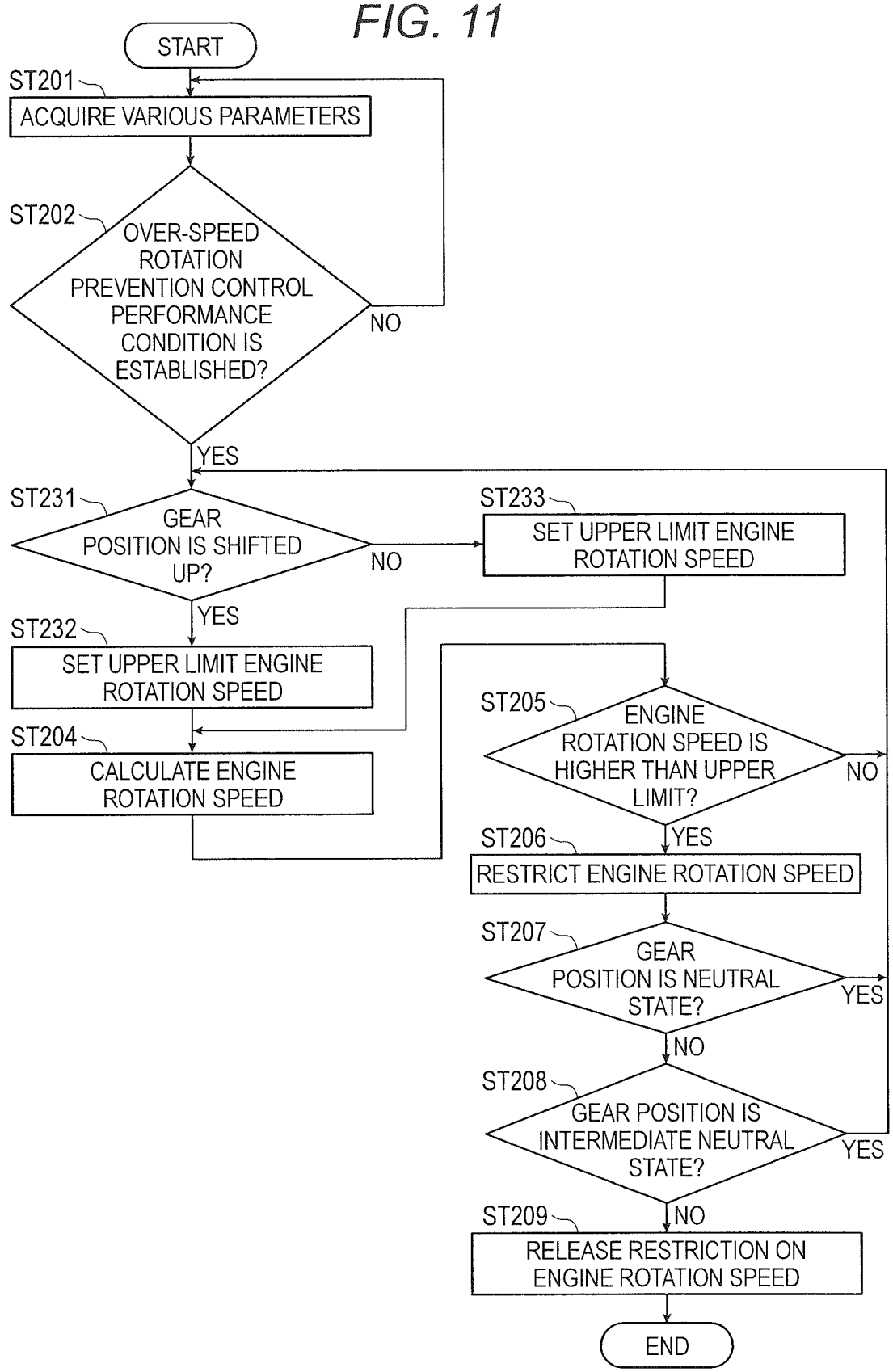
FIG. 11 is a view illustrating an over-speed rotation prevention control flow according to a third modification.

FIG. 11 is a view illustrating an over-speed rotation prevention control flow according to a third modification. In the third modification, during gear upshifting, a second upper limit rotation speed which is higher than the engine rotation speed detected at the time of a gear change operation is set, and during gear downshifting, a second upper limit rotation speed which is lower than the engine rotation speed detected at the time of a gear change operation is set. Specifically, as shown in FIG. 11, in STEP ST231 which is performed after the over-speed rotation prevention control performance condition is established ("YES" in STEP ST202), the ECU 3 determines whether the gear position has been shifted up or not. If the gear position has been shifted up ("YES" in STEP ST231), the ECU proceeds to the process of STEP ST232. If the gear position has not been shifted up ("NO" in STEP ST231), i.e. if the gear position has been shifted down, the ECU proceeds to the process of STEP ST233.

In STEP ST232, the ECU 3 sets an upper limit engine rotation speed (a second upper limit rotation speed which is lower than the first upper limit rotation speed). Specifically, the ECU 3 acquires a rotation speed correction value defined in the predetermined map on the basis of the gear position, and sets a value obtained by adding the rotation speed correction value to the drive wheel engine rotation speed, as a second upper limit rotation speed. In the case of gear upshifting, as a correction value, for example, a negative value is used. Subsequently, the ECU proceeds to the process of STEP ST204.

In STEP ST233, the ECU 3 sets an upper limit engine rotation speed (a second upper limit rotation speed which is lower than the first upper limit rotation speed). Specifically, the ECU 3 acquires a rotation speed correction value defined in the predetermined map on the basis of the gear position, and sets a value obtained by adding the rotation speed correction value to the drive wheel engine rotation speed, as a second upper limit rotation speed. In the case of gear downshifting, as a correction value, for example, a positive value is used. Subsequently, the ECU proceeds to the process of STEP ST204.

Like this, in the third modification, during gear upshifting, a second upper limit rotation speed which is higher than the engine rotation speed detected at the time of a gear change operation is set, and during gear downshifting, a second upper limit rotation speed which is lower than the engine rotation speed detected at the time of a gear change operation is set. Specifically, if a gear change operation is detected, the ECU 3 acquires the engine rotation speed, and sets a value obtained by adding a predetermined correction value to the engine rotation speed, as a second upper limit rotation speed. The corresponding correction value may be a positive or negative value, or zero, and is given from a map set in advance, on the basis of the current or next gear position, and whether it is gear upshifting or gear downshifting.

Figure 12:
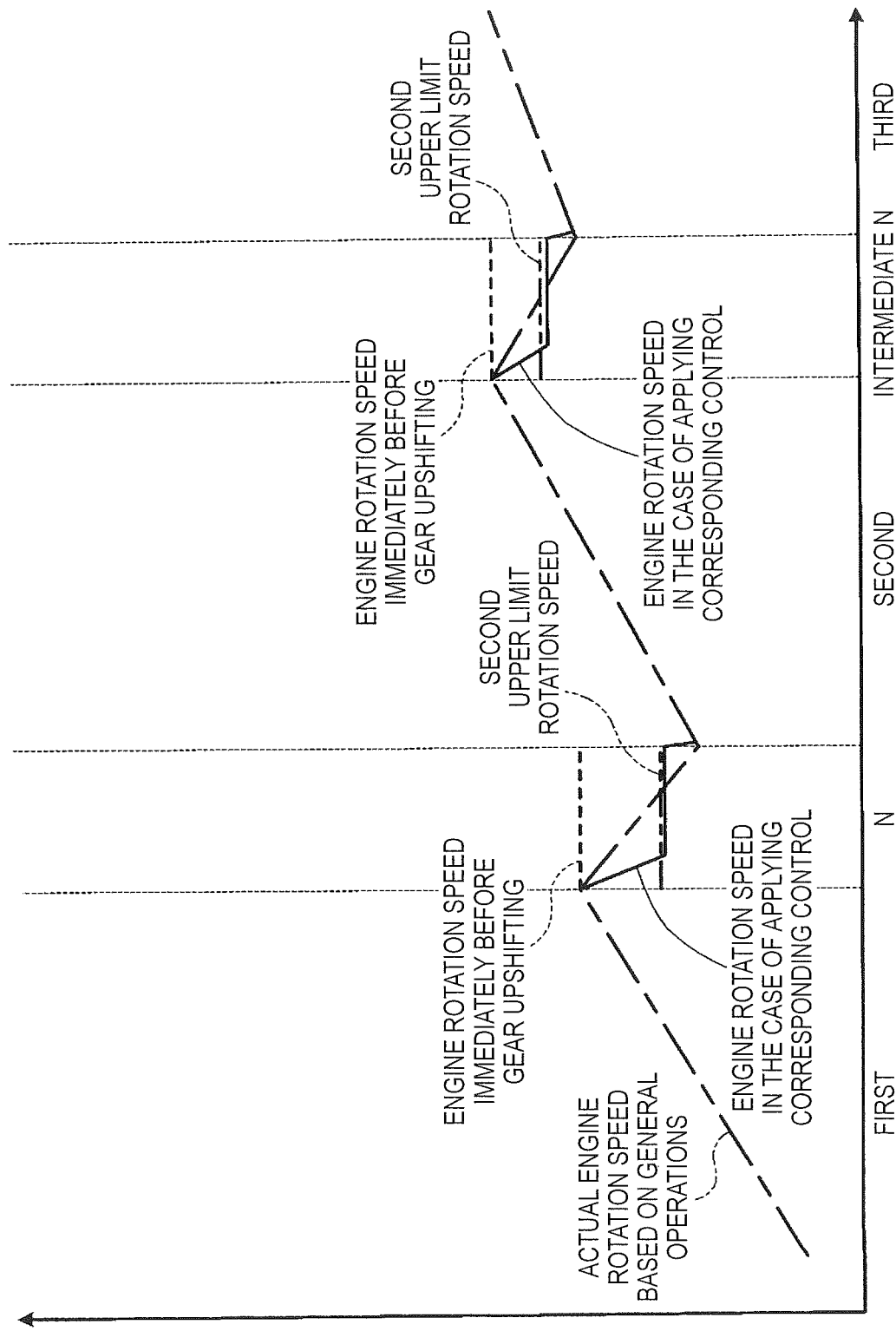
FIG. 12 is a time chart illustrating temporal change of engine rotation speed corresponding to FIG. 11.

FIG. 12 is a time chart illustrating temporal change of the engine rotation speed corresponding to FIG. 11. In FIG. 12, the horizontal axis and the vertical axis correspond to those of FIG. 6, and the types of lines correspond to those of FIG. 6. Also, broken lines shown in FIG. 12 represent the engine rotation speed at the time of a gear change operation.

As shown in FIG. 12, in the neutral state and the intermediate neutral state, a second upper limit rotation speed which is higher than the engine rotation speed detected immediately before gear upshifting by a predetermined value is set. In the corresponding modification, even if a throttle operation is performed in the neutral state and the intermediate neutral state, it is possible to prevent change of the engine rotation speed such as change to a speed higher than a second upper limit rotation speed, and it is possible to minimize the difference between the engine rotation speed before gear change and the engine rotation speed after gear change. As a result, smooth and comfortable traveling after the gear change operation becomes possible.

Especially, as shown in FIG. 12, in the case of gear upshifting, a second upper limit rotation speed which is lower than the previous engine rotation speed and slightly higher than the engine rotation speed after gear change is set. Therefore, from the previous engine rotation speed, the rotation speed automatically decreases, so an unintended rise in the engine rotation speed does not occur. Further, the engine rotation speed smoothly approaches the engine rotation speed after gear change. Therefore, even after gear change, it is possible to continue acceleration without a feeling of discomfort.

Like this, an appropriate upper limit engine rotation speed for an engine rotation speed variation pattern according to each of upshifting and downshifting of the gear position is set.

Therefore, it is possible to better keep the rotation speed difference between the engine side and the drive wheel side small, and smoother and more comfortable traveling after the gear change operation becomes possible. Moreover, this setting is more effective when it is used on the low-speed gear side on which variation in the engine rotation speed during gear change is significant.

Figure 13:
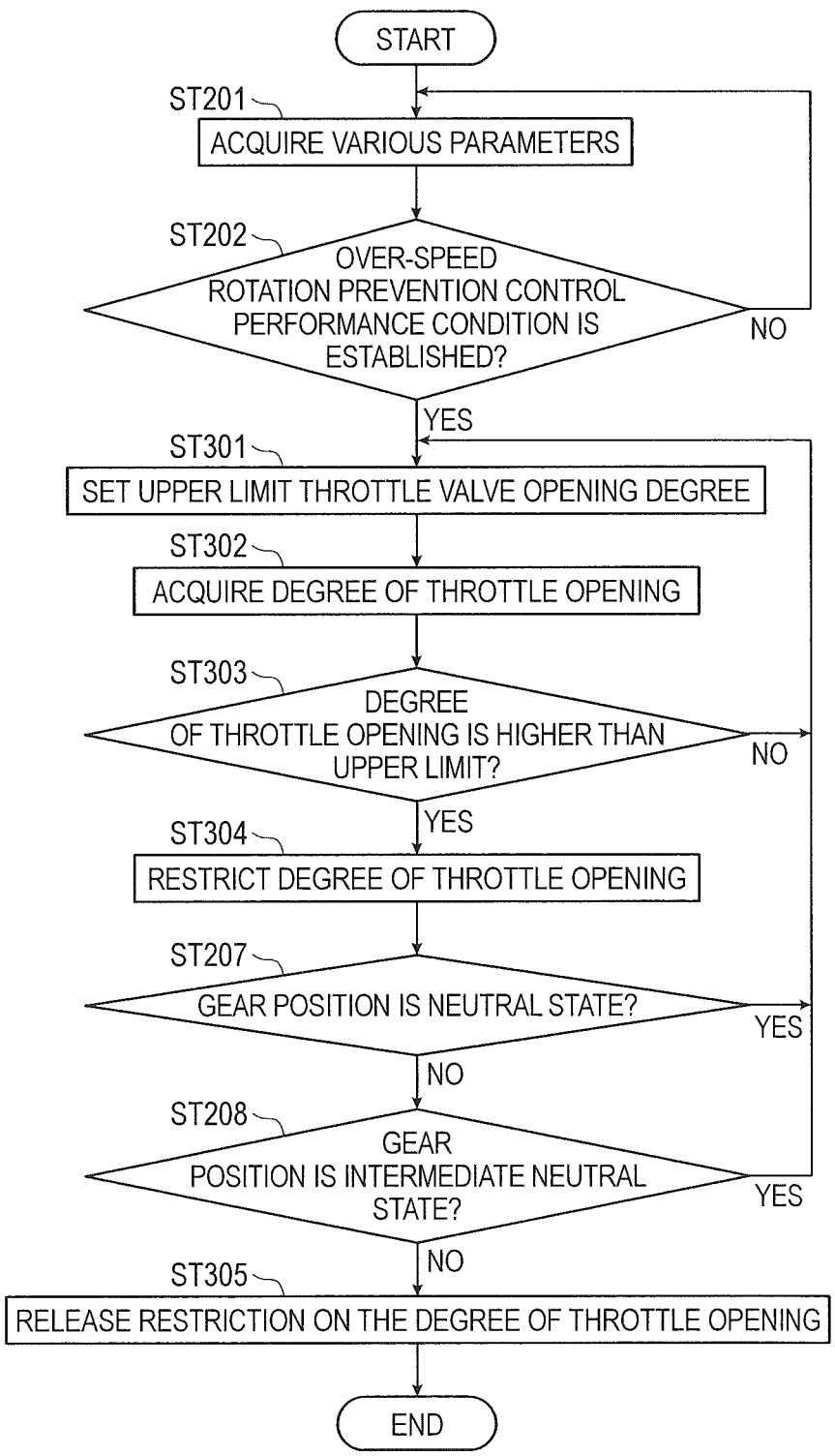
FIG. 13 is a view illustrating an example of an over-speed rotation prevention control flow according to a second embodiment.

Also, in the above-described embodiment, whether to perform the over-speed rotation prevention control is determined on the basis of the engine rotation speed (a second upper limit rotation speed); however, the present disclosure is not limited to this configuration. For example, instead of the engine rotation speed, the throttle valve opening degree may be used. Now, with reference to FIG. 13, a second embodiment will be described. FIG. 13 is a view illustrating an example of an over-speed rotation prevention control flow according to the second embodiment. FIG. 13 is obtained by substituting the engine rotation speed shown in FIG. 5 with the throttle valve opening degree, and has the same basic flow as that of FIG. 5. For this reason, the difference will be mainly described, and the others are appropriately omitted.

As shown in FIG. 13, if the over-speed rotation prevention control performance determination establishment flag has been set ("YES" in STEP ST202), subsequently, in STEP ST301, the ECU 3 sets an upper limit throttle valve opening degree. Specifically, the ECU 3 acquires an upper limit throttle valve opening degree corresponding to the vehicle velocity of the rear wheel, from a predetermined map defined in advance, and sets the upper limit throttle valve opening degree. Also, the upper limit throttle valve opening degree which is set in this stage is a second upper limit throttle valve opening degree which is lower than a first upper limit throttle valve opening degree. Subsequently, the ECU proceeds to the process of STEP ST302.

In STEP ST302, the ECU 3 acquires the throttle valve opening degree from the throttle opening sensor 41. Then, the ECU proceeds to the process of STEP ST303.

In STEP ST303, the ECU 3 determines whether the throttle valve opening degree is higher than the second upper limit throttle valve opening degree or not. If the throttle valve opening degree is higher than the second upper limit throttle valve opening degree ("YES" in STEP ST303), the ECU proceeds to the process of STEP ST304. If the throttle valve opening degree is equal to or lower than the second upper limit throttle valve opening degree ("NO" in STEP ST303), the ECU returns to the process of STEP ST301. At this time, if the over-speed rotation prevention control is being performed, the ECU interrupts the over-speed rotation prevention control.

In STEP ST304, the ECU 3 restricts the throttle valve opening degree. Specifically, the ECU 3 performs the over-speed rotation prevention control to decrease the engine rotation speed. The throttle valve opening degree is restricted to the second upper limit throttle valve opening degree. As a result, the flow of intake air is restricted, and an excessive rise in the engine rotation speed is suppressed. Subsequently, the ECU proceeds to the process of STEP ST207.

Also, if the gear position is not the intermediate neutral state ("NO" in STEP ST208), subsequently, in STEP ST305, the ECU 3 determines that the gear change operation of the transmission 15 has been completed, and releases the restriction on the throttle valve opening degree. In other words, the ECU 3 ends the over-speed rotation prevention control. Therefore, the flow ends.

Like this, in the second embodiment, if the gear position is the neutral gear position or the intermediate neutral position, the ECU 3 sets a second upper limit throttle valve opening degree which is lower than the first upper limit throttle valve opening degree, and then if the throttle valve opening degree at that time is higher than the second upper limit throttle valve opening degree, the ECU performs the over-speed rotation prevention control. According to this configuration, even if the rider performs an operation of opening the accelerator during a gear change operation, an unintended rise in the engine rotation speed is suppressed, and smoother and more comfortable traveling after the gear change operation becomes possible.

Also, if the gear position gets out of the neutral state or the intermediate neutral state, the ECU 3 releases the restriction on the throttle valve opening degree, and then performs control such that the throttle valve opening degree gradually approaches the degree of accelerator opening. In other words, after gear change, the ECU releases the restriction on the throttle valve opening degree. In this case, the throttle valve is controlled in the opening direction in which the throttle valve opening converges to the degree of opening corresponding to the degree of accelerator opening. At this time, if the throttle valve is controlled such that it is gradually opened, not quickly, it becomes difficult for a sudden rise in the drive power to occur after completion of gear change. Therefore, even if the engine rotation speed after completion of gear change is higher than an expected rotation speed, it is possible to rapidly converge the engine rotation speed to the expected rotation speed.

Figure 14:
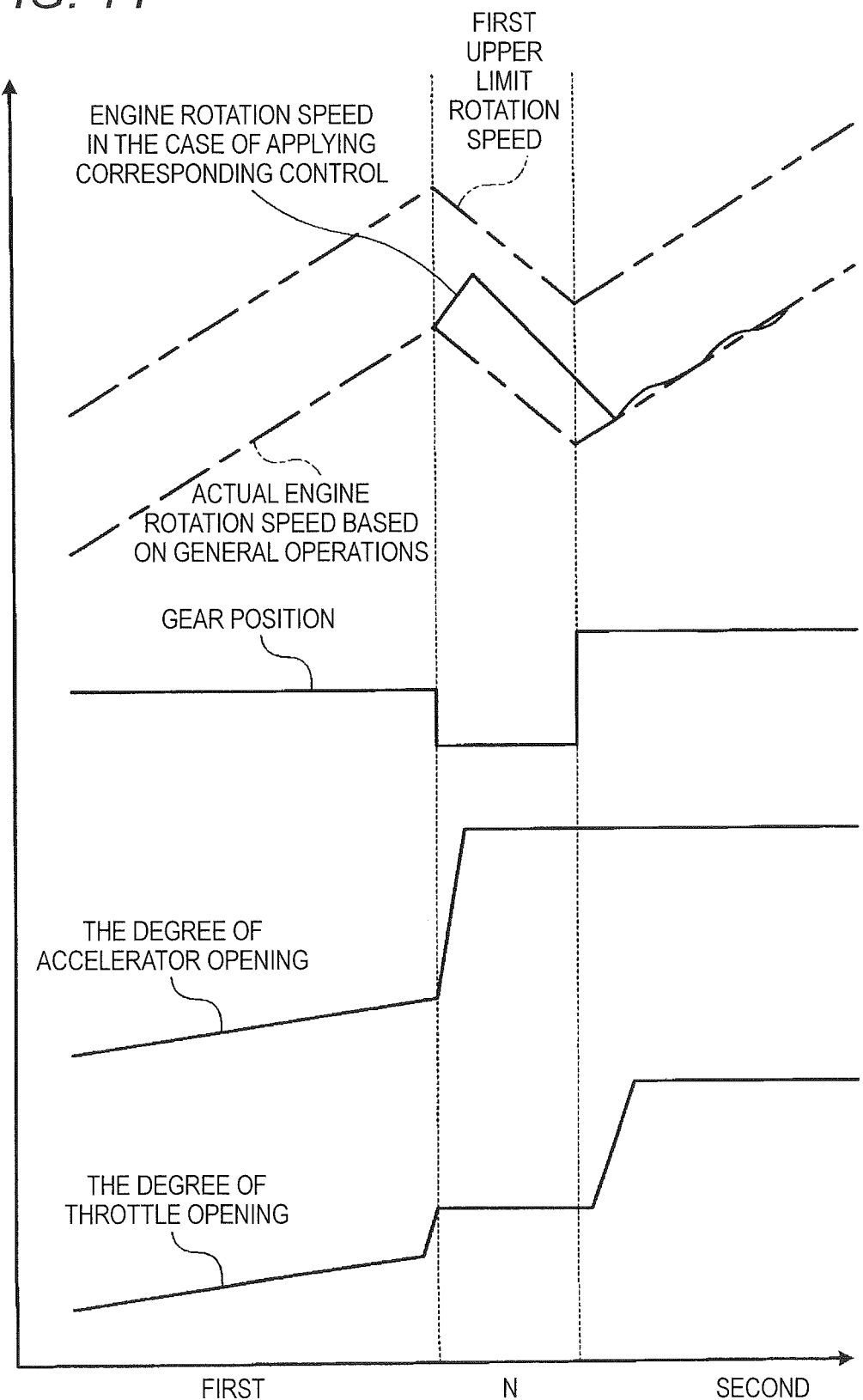
FIG. 14 is a time chart illustrating temporal changes of various parameters corresponding to the second embodiment.

FIG. 14 is a time chart illustrating temporal change of the engine rotation speed in the case of applying the over-speed rotation prevention control according to the second embodiment. In FIG. 14, the horizontal axis represents time, and the vertical axis represents the engine rotation speed, the gear position, the degree of accelerator opening, and the throttle valve opening degree in the order from the top. Also, in FIG. 14, N indicates the neutral gear position. Also, in FIG. 14, a solid line represents the engine rotation speed in the case of applying the above-mentioned control, and an alternate long and short dash line represents the actual engine rotation speed based on general operations, and an alternate long and two short dashes line represents the upper limit engine rotation speed (for example, the first upper limit rotation speed).

As shown in FIG. 14, in the neutral state, for example, a second upper limit throttle valve opening degree based on the vehicle velocity of the rear wheel is set. In the neutral state, since the vehicle velocity of the rear wheel tends to decrease, as the vehicle velocity decreases, a lower second upper limit throttle valve opening degree is set. Therefore, even if a throttle operation is performed in the neutral state, the throttle valve opening degree is adjusted so as not to exceed the second upper limit throttle valve opening degree. Therefore, it is possible to prevent change of the engine rotation speed such as change to a speed higher than an upper limit engine rotation speed, and it is possible to minimize the difference between the engine rotation speed before gear change and the engine rotation speed after gear change. As a result, smooth and comfortable traveling after the gear change operation becomes possible. Also, although the neutral state is shown as an example in FIG. 14, even in the intermediate neutral state, it is possible to apply the same control.

Also, in each embodiment described above, with reference to the time chart, the control in the case of gear upshifting has been described as an example; however, the present disclosure is not limited thereto. The corresponding control can also be applied to the case of gear downshifting.

Also, in each embodiment described above, the case where the present disclosure is applied to a vehicle having an engine has been described; however, the present disclosure is not limited to this configuration. For example, it is also possible to apply the idea of the above-described over-speed rotation prevention control to electric motors which are used as drive sources for so-called "hybrid" vehicles, each of which uses the combination of an engine and an electric motor, and electric vehicles. In this case, rotation speed which is the object of the over-speed rotation prevention control may be "motor rotation speed", instead of the "engine rotation speed".

Also, although the embodiments and the modifications have been described, as other embodiments of the present disclosure, combinations of all or some components of the embodiment and the modifications may be made.

Also, the embodiment of the present disclosure is not limited to the above-described embodiment, and various changes, replacements, and modifications may be made without departing from the gist of the technical idea of the present disclosure. Moreover, if the technical idea of the present disclosure can be realized in a different manner, owing to the progress of technology or by other derived technology, the present disclosure may be carried out in the different manner. Accordingly, the claims cover all the embodiments which can fall within the scope of the technical idea of the present disclosure.

As described above, the present disclosure has the effect that it is possible to suppress a rise in rotation speed which is not intended by a rider during gear change, and is useful particularly in rotation speed control devices for vehicles having constant-mesh type transmissions.

What is claimed is:

1. A rotation speed control device for performing over-speed rotation prevention control to decrease an engine rotation speed if the engine rotation speed exceeds a first upper limit rotation speed,
   wherein if a gear position of a transmission is a neutral state or an intermediate neutral state in which predetermined gears are not engaged with each other in the middle of a gear change operation of the transmission, a second upper limit rotation speed which is lower than the first upper limit rotation speed is set,
   wherein if the engine rotation speed at the time when the gear position of the transmission is the neutral state or the intermediate neutral state is higher than the second upper limit rotation speed, the over-speed rotation prevention control is performed, and
   wherein the second upper limit rotation speed is set so as to increase as vehicle velocity increases.

2. The rotation speed control device according to claim 1, wherein the second upper limit rotation speed is set based on a wheel velocity of a drive wheel and the gear position.

3. The rotation speed control device according to claim 2, wherein the second upper limit rotation speed is set based on the wheel velocity of the drive wheel and the gear position to be set after the gear change operation.

4. The rotation speed control device according to claim 1, wherein the second upper limit rotation speed is set so as to increase as the gear position is shifted up.

5. The rotation speed control device according to claim 1, wherein the second upper limit rotation speed is set based on the engine rotation speed which is detected at the time of a gear change operation.

6. The rotation speed control device according to claim 5, wherein during gear upshifting, the second upper limit rotation speed is set lower than the engine rotation speed at the time of the gear change operation, and during gear downshifting, the second upper limit rotation speed is set higher than the engine rotation speed at the time of the gear change operation.

7. The rotation speed control device according to claim 1, wherein the transmission is configured with a constant-mesh transmission.

8. The rotation speed control device according to claim 1, wherein the over-speed rotation prevention control is performed by at least one of fuel cut, fuel injection quantity adjustment, throttle valve opening adjustment, ignition timing adjustment, and misfire.

9. A rotation speed control device for performing over-speed rotation prevention control to decrease an engine rotation speed by restricting a throttle valve opening degree if the throttle valve opening degree exceeds a first upper limit throttle valve opening degree,
   wherein if a gear position of a transmission is a neutral state or an intermediate neutral state in which predetermined gears are not engaged with each other in the middle of a gear change operation of the transmission, a second upper limit throttle valve opening degree which is lower than the first upper limit throttle valve opening degree is set,
   wherein if the throttle valve opening degree at the time when the gear position of the transmission is the neutral state or the intermediate neutral state is higher than the second upper limit throttle valve opening degree, the over-speed rotation prevention control is performed, and
   wherein if the gear position gets out of the neutral state or the intermediate neutral state, restriction on the throttle valve opening degree is released, and then the throttle valve opening degree is controlled to gradually approach an accelerator opening degree.

10. The rotation speed control device according to claim 1,
    wherein the rotation speed control device is configured to perform the over-speed rotation prevention control to decrease the engine rotation speed by restricting a throttle valve opening degree if the throttle valve opening degree exceeds a first upper limit throttle valve opening degree,
    wherein if the gear position of the transmission is the neutral state or the intermediate neutral state, a second upper limit throttle valve opening degree which is lower than the first upper limit throttle valve opening degree is set, and
    wherein if the throttle valve opening degree at the time when the gear position of the transmission is the neutral state or the intermediate neutral state is higher than the second upper limit throttle valve opening degree, the over-speed rotation prevention control is performed.

11. A rotation speed control device for performing over-speed rotation prevention control to decrease an engine rotation speed if the engine rotation speed exceeds a first upper limit rotation speed,
    wherein if a gear position of a transmission is a neutral state or an intermediate neutral state in which predetermined gears are not engaged with each other in the middle of a gear change operation of the transmission, a second upper limit rotation speed which is lower than the first upper limit rotation speed is set,
    wherein if the engine rotation speed at the time when the gear position of the transmission is the neutral state or the intermediate neutral state is higher than the second upper limit rotation speed, the over-speed rotation prevention control is performed,
    wherein the second upper limit rotation speed is set based on a wheel velocity of a drive wheel and the gear position, and
    wherein the second upper limit rotation speed is set based on the wheel velocity of the drive wheel and the gear position to be set after the gear change operation.

12. The rotation speed control device according to claim 11,
    wherein the rotation speed control device is configured to perform the over-speed rotation prevention control to decrease the engine rotation speed by restricting a throttle valve opening degree if the throttle valve opening degree exceeds a first upper limit throttle valve opening degree,
    wherein if the gear position of the transmission is the neutral state or the intermediate neutral state, a second upper limit throttle valve opening degree which is lower than the first upper limit throttle valve opening degree is set, and
    wherein if the throttle valve opening degree at the time when the gear position of the transmission is the neutral state or the intermediate neutral state is higher than the second upper limit throttle valve opening degree, the over-speed rotation prevention control is performed.

* * * * *